United States Patent
Kommula et al.

(10) Patent No.: US 12,099,427 B2
(45) Date of Patent: Sep. 24, 2024

(54) MACHINE LEARNING FOR METRIC COLLECTION

(71) Applicant: Juniper Networks, Inc., Sunnyvale, CA (US)

(72) Inventors: Raja Kommula, Cupertino, CA (US); Ganesh Byagoti Matad Sunkada, Bengaluru (IN); Thayumanavan Sridhar, Sunnyvale, CA (US); Thiraviya Eswaran, Karur (IN); Raj Yavatkar, Los Gatos, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 17/810,178

(22) Filed: Jun. 30, 2022

(65) Prior Publication Data

US 2023/0336447 A1    Oct. 19, 2023

(30) Foreign Application Priority Data

Apr. 16, 2022   (IN) .............................. 202241022566

(51) Int. Cl.
*H04L 43/08*    (2022.01)
*G06F 11/32*    (2006.01)
(Continued)

(52) U.S. Cl.
CPC ........ *G06F 11/3409* (2013.01); *G06F 11/327* (2013.01); *H04L 41/0604* (2013.01); *H04L 41/0609* (2013.01); *H04L 41/0681* (2013.01); *H04L 41/16* (2013.01); *H04L 43/024* (2013.01); *H04L 43/04* (2013.01); *H04L 43/08* (2013.01)

(58) Field of Classification Search
CPC ..... H04L 41/0609; H04L 41/16; H04L 43/08; H04L 43/024
See application file for complete search history.

(56) References Cited

U.S. PATENT DOCUMENTS 7,296,132 B1 *  11/2007  Gross .................. G06F 11/3476
                                                 711/170
7,522,071 B2 *   4/2009  Caselli ................... G05B 21/02
                                                  341/51

(Continued)

FOREIGN PATENT DOCUMENTS

CN     109542740 A        3/2019
WO     2013184846 A1     12/2013

OTHER PUBLICATIONS

U.S. Appl. No. 17/810, 167, filed Jun. 30, 2022, naming inventors Kommula et al.

(Continued)

*Primary Examiner* — Nam T Tran
(74) *Attorney, Agent, or Firm* — Shumaker & Sieffert, P.A.

(57) ABSTRACT

A performance monitoring system includes a metric collector configured to receive, via metric exporters, telemetry data comprising metrics related to a network of computing devices. A metric time series database stores related metrics. An alert rule evaluator service is configured to evaluate rules using stored metrics. The performance monitoring system may include a machine learning module and is configured to determine optimized metric collection sampling intervals and rule evaluation intervals, and to automatically determine recommended alert rules.

20 Claims, 14 Drawing Sheets

(51) Int. Cl.
  *G06F 11/34* (2006.01)
  *H04L 41/0604* (2022.01)
  *H04L 41/0681* (2022.01)
  *H04L 41/16* (2022.01)
  *H04L 43/024* (2022.01)
  *H04L 43/04* (2022.01)

(56) References Cited

U.S. PATENT DOCUMENTS

| | | | |
|---|---|---|---|
| 9,571,394 | B1 | 2/2017 | Sivaramakrishnan et al. |
| 9,749,199 | B2 * | 8/2017 | Brown .................. H04L 43/024 |
| 9,983,968 | B2 | 5/2018 | Gwozdz |
| 10,235,263 | B2 | 3/2019 | Megahed et al. |
| 10,536,352 | B1 | 1/2020 | Brisebois et al. |
| 11,025,521 | B1 * | 6/2021 | Neill ........................ H04L 41/16 |
| 11,516,308 | B1 * | 11/2022 | Dubynskiy ............ H04L 43/024 |
| 2009/0292954 | A1 | 11/2009 | Jiang et al. |
| 2009/0306803 | A1 * | 12/2009 | Behm ............... G05B 19/41865 |
| | | | 700/109 |
| 2016/0124830 | A1 | 5/2016 | Banerjee et al. |
| 2018/0189163 | A1 | 7/2018 | Megahed et al. |
| 2018/0241644 | A1 | 8/2018 | Lu |
| 2019/0114245 | A1 * | 4/2019 | Mermoud ............... H04L 43/12 |
| 2020/0192741 | A1 | 6/2020 | Estrada et al. |
| 2020/0356459 | A1 * | 11/2020 | Harutyunyan ........ H04L 43/024 |
| 2020/0382361 | A1 | 12/2020 | Chandrasekhar et al. |
| 2021/0149394 | A1 * | 5/2021 | Li .......................... H04L 43/024 |
| 2021/0218619 | A1 * | 7/2021 | Harutyunyan ........... H04L 41/12 |
| 2022/0121967 | A1 | 4/2022 | Azizsoltani et al. |
| 2023/0128567 | A1 * | 4/2023 | Mermoud ............. H04L 41/147 |
| | | | 709/223 |
| 2023/0229675 | A1 * | 7/2023 | Hautyunyan ......... H04L 43/024 |
| | | | 707/737 |

OTHER PUBLICATIONS

U.S. Appl. No. 17/810,185, filed Jun. 30, 2022, naming inventors Kommula et al.

Response to Office Action dated Sep. 18, 2023 from U.S. Appl. No. 17/810,167, filed Dec. 18, 2023, 8 pp.

Corno et al., "RecRules: Recommending IF-THEN Rules for End-User Development", ACM Transactions on Intelligent Systems and Technology, vol. 10, No. 5, Sep. 5, 2019, 27 pp.

Extended Search Report from counterpart European Application No. 22215171.4 dated Jul. 13, 2023, 9 pp.

Office Action from U.S. Appl. No. 17/810,167 dated Sep. 18, 2023, 17 pp.

Response to Extended Search Report dated Jul. 13, 2023, from counterpart European Application No. 22215171.4 filed Apr. 16, 2024, 13 pp.

* cited by examiner

MACHINE LEARNING FOR METRIC COLLECTION

PRIORITY CLAIM

This application claims priority to Indian Provisional Patent Application No. 202241022566, filed on Apr. 16, 2022, the entire contents of which is incorporated herein by reference.

TECHNICAL FIELD

This disclosure relates to computer networks and, more specifically, to improving collection and evaluation of telemetry data in computer networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage servers and application servers (compute nodes) are interconnected via high-speed switch fabric provided by one or more tiers of physical network switches and routers. More sophisticated data centers provide infrastructure spread throughout the world with subscriber support equipment located in various physical hosting facilities.

The connectivity between the server and the switch fabric occurs at a hardware module called the Network Interface Card (NIC). A conventional NIC includes an application-specific integrated circuit (ASIC) to perform packet forwarding, which includes some basic Layer 2/Layer 3 (L2/L3) functionality. In conventional NICs, the packet processing, policing and other advanced functionality, known as the "datapath," is performed by the host CPU, i.e., the CPU of the server that includes the NIC. As a result, the CPU resources in the server are shared by applications running on that server and also by datapath processing. For example, in a 4 core x86 server, one of the cores may be reserved for the datapath, leaving 3 cores (or 75% of CPU) for applications and the host operating system.

Performance monitoring systems enable monitoring of data center performance. Telemetry data includes a variety of metrics regarding network elements/nodes, which can be communicated to a metric collector of a typically centralized and remote performance monitoring system to be evaluated according to various rules. This allows users such as network administrators to measure and evaluate many different performance measures regarding the network such as CPU usage, memory usage, total network devices and applications, link and node utilization, network congestion, etc.

Some NIC vendors have begun including an additional processing unit in the NIC itself to offload at least some of the datapath processing from the host CPU to the NIC. The processing unit in the NIC may be, e.g., a multi-core ARM processor with some hardware acceleration provided by a Data Processing Unit (DPU), Field Programmable Gate Array (FPGA), and/or an ASIC. NICs that include such augmented datapath processing capabilities are typically referred to as SmartNICs and can provide extra processing capacity that can aid in the transmission of telemetry data.

SUMMARY

In general, techniques are described for computing infrastructure performance monitoring systems using machine learning to provide improved metric collection sampling intervals, improved rule evaluation intervals, and/or ongoing rule recommendations, in order to conserve network resources and provide more meaningful data to provide improved insight into a network.

Performance monitoring systems include a collector to collect telemetry data (metrics) related to computing nodes in a network and an alert rule evaluator service to analyze the telemetry data according to alert rules that determine if an alarm should be generated based on the telemetry data. The telemetry data is collected at a predetermined collection sampling interval and rules are evaluated at a predetermined rule evaluation interval.

Rather than collecting telemetry data at a fixed static rate in which a collector uses a static sampling interval for collecting metrics, the performance monitoring system described in this disclosure may reduce storage space required for storing metrics and avoid unnecessary collection of metrics data that are not relevant for a given use case and/or context. That is, a collector that uses static sampling intervals for collecting metrics may have disadvantages related to an amount of storage space required for storing the metrics, especially in a large data center that may include many computing nodes and many alert rules. Further disadvantages may include metrics that are collected which may not be relevant to a user, a large amount of compute power may be required to search for metrics that may not be relevant to a user, and collected metrics may be redundant when metric values do not change much over time. Therefore, a metric collector may end up collecting many less useful metrics using the same sampling interval as more relevant metrics are collected. The above listed issues may be more apparent and problematic with metric collection in a scaled network environment. In examples, performance monitoring systems that implement various aspects of the techniques described in this disclosure may utilize machine learning to determine one or more metric relevance attributes which represent the usefulness of a metric to a user to predict a metric weight and a corresponding optimized collection sampling rate for that metric. In this respect, rather than use fixed static time intervals for collecting metrics, the performance monitoring system described in this disclosure may efficiently identify and optimize collection sampling rates for metrics.

Further, the periodic rule evaluation process involves compute intensive tasks like querying of a huge amount of telemetry data, aggregating the telemetry data, and comparing aggregated data against multiple threshold values. A rule evaluation process using static evaluation intervals may fail to appropriately evaluate rules when a large number of rules are configured in a computational resource-constrained environment. Also, computational resources may be wasted while processing too many rules in a heavily loaded system. To get around these scaling issues, administrators usually limit the number of rules they configure or increase the rule evaluation interval (i.e., decrease the rate of rule evaluation).

The performance monitoring system described in this disclosure may avoid the above noted issues of static evaluation intervals by employing an optimized rule evaluation interval in which rules may be evaluated at different frequencies (i.e., using different rule evaluation intervals), such as based on their past evaluation success or failure (hit or miss) rate. When a rule is not hit for a long period of time, solutions based on a fixed evaluation rate will waste resources as the probability of an evaluation resulting in a hit in the near future is low.

In contrast, a performance monitoring system that implements a machine learning based intelligent process for rule evaluation in which alert rules are evaluated periodically at optimized rule evaluation intervals, which may vary over time as network conditions change, provides many advantages. An evaluation interval for a rule may be assigned based on a determined weight of a rule. A determined weight of a rule may indicate a priority of the rule, and may be inversely proportional to a desired evaluation interval of the rule. In other words, when the weight of the rule is higher, the corresponding evaluation interval is less and when the weight of the rule is lower, the corresponding evaluation interval is greater. The weight of rule may be predicted using a machine learning model and past rule evaluation data.

Performance monitoring systems that optimize collection sampling intervals for metrics and optimize rule evaluation intervals for evaluating rules enable computing nodes of the network being monitored and the performance monitoring system itself to operate more efficiently in terms of reduced consumption of computing resources, such as processing cycles, memory, memory bus bandwidth, and the like, as well as reduced consumption of associated power requirements.

In one example, the disclosure describes a method comprising: collecting, by a performance monitoring system, telemetry data comprising metrics related to a network of computing devices, wherein, for each metric, metric values associated with a corresponding metric name of the metric are collected at each of a plurality of times according to a first collection sampling interval; evaluating, by the performance monitoring system, alert rules using the collected telemetry data, wherein evaluating a first metric of a first rule includes comparing metric values associated with a corresponding metric name of the first metric to a corresponding threshold value of the first rule at a plurality evaluation times to generate a metric attribute; determining, by the performance monitoring system, a predicted metric weight for the first metric based on the metric attribute; and determining, by the performance monitoring system, a second collection sampling interval for the first metric based on the predicted metric weight.

In another example, this disclosure describes a performance monitoring system, comprising: a memory; and one or more processors in communication with the memory, the one or more processors configured to execute a collector and an alert rule evaluator service, wherein the collector is configured to receive telemetry data via metric exporters, the telemetry data comprising metrics related to a network of computing devices, wherein, for each metric, metric values associated with a corresponding metric name are configured to be collected at each of a plurality of times based on a corresponding first predetermined collection sampling interval; wherein the alert rule evaluator service is configured to evaluate rules using the collected telemetry data, wherein, to evaluate a first metric of a first rule, the alert rule evaluator service uses metric values associated with a corresponding metric name of the first metric, compares a corresponding metric value to a corresponding threshold value of the first rule at each of a plurality of rule evaluation times, generates an alert if a comparison condition of the first rule is met, and stores the generated alerts in the memory, wherein the collector is configured to: access the generated alerts in the memory to calculate a metric attribute of the first metric, determine a predicted metric weight using the metric attribute of the first metric, and determine a second collection sampling interval for the first metric based on the determined metric weight.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
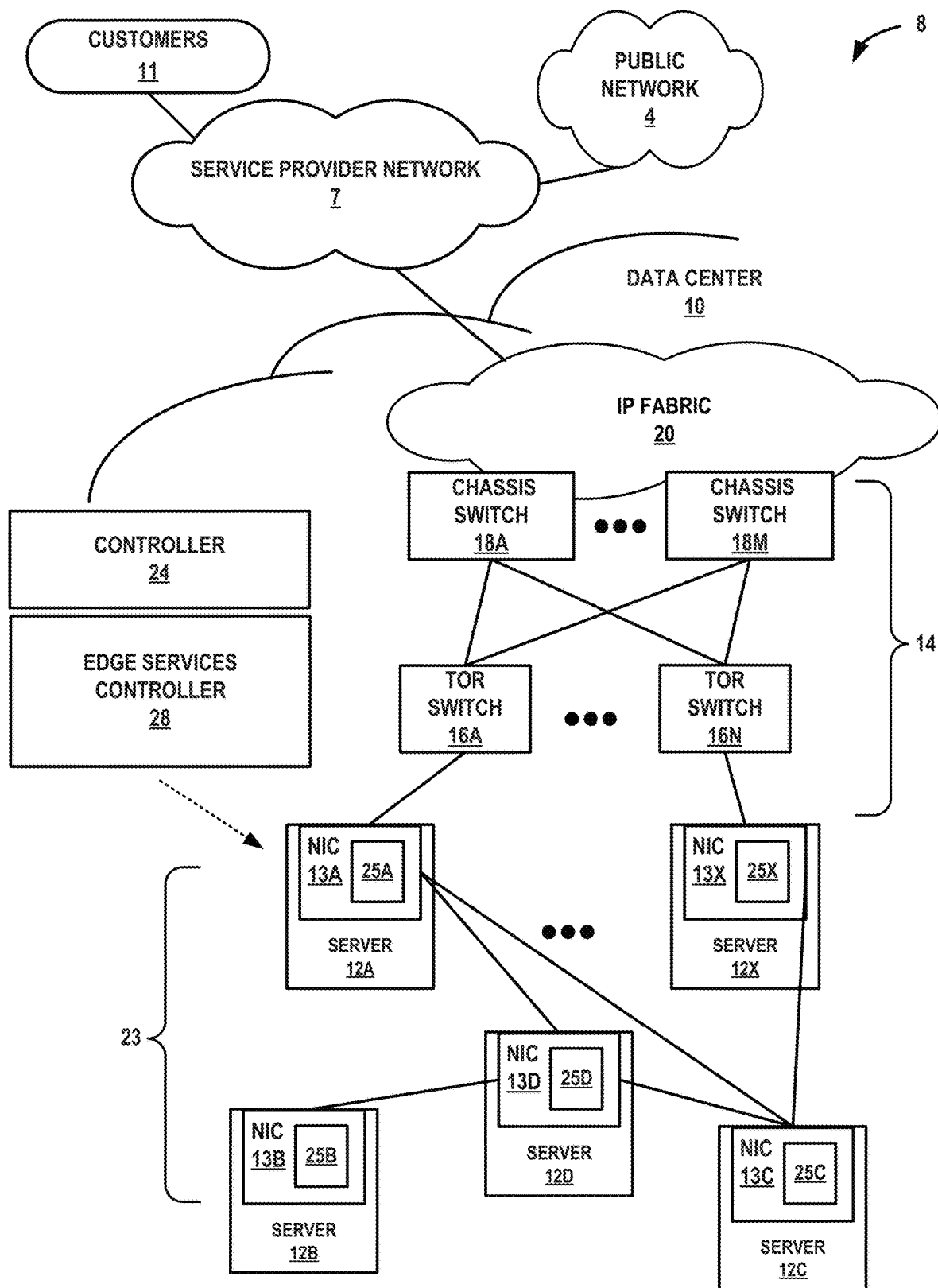
FIG. 1 is a block diagram illustrating an example network system having a data center in which examples of the techniques described herein may be implemented.

FIG. 1 is a block diagram illustrating an example network system 8 having computing infrastructure in which examples of the techniques described herein may be implemented. In general, data center 10 provides an operating environment for applications and services for one or more customer sites 11 (illustrated as "customers 11") having one or more customer networks coupled to the data center by service provider network 7.

Data center 10 may, for example, host infrastructure equipment, such as networking and storage systems, redundant power supplies, and environmental controls. Service provider network 7 is coupled to public network 4, which may represent one or more networks administered by other providers, and may thus form part of a large-scale public network infrastructure, e.g., the Internet. Public network 4 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 4 are illustrated and described primarily as edge networks of service provider network 7, in some examples, one or more of customer sites 11 and public network 4 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 4. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N (herein, "TOR switches 16"). Servers 12 may also be referred to herein as "hosts" or "host devices." Data center 10 may include many additional servers coupled to other TOR switches 16 of the data center 10. Each host device in such a data center may execute one or more virtual machines, pods, or other deployable virtual execution element, which may be referred to as workloads. Clients of the data center usually have access to these workloads, and can install applications and perform other operations using such workloads. Workloads that run on different host devices but are accessible by one particular client are organized into a virtual network. Each client usually has at least one virtual network. Those virtual networks are also called overlay networks.

In some cases, a client of the data center may experience network issues such as increased latency, packet loss, low network throughput, or slow workload processing. Troubleshooting such issues may be complicated by the deployment of workloads in a large multitenant data center. Telemetry data, such as that provided by a telemetry service and analyzed by a performance monitoring system, may be used to facilitate troubleshooting in a data center.

Figure 4:
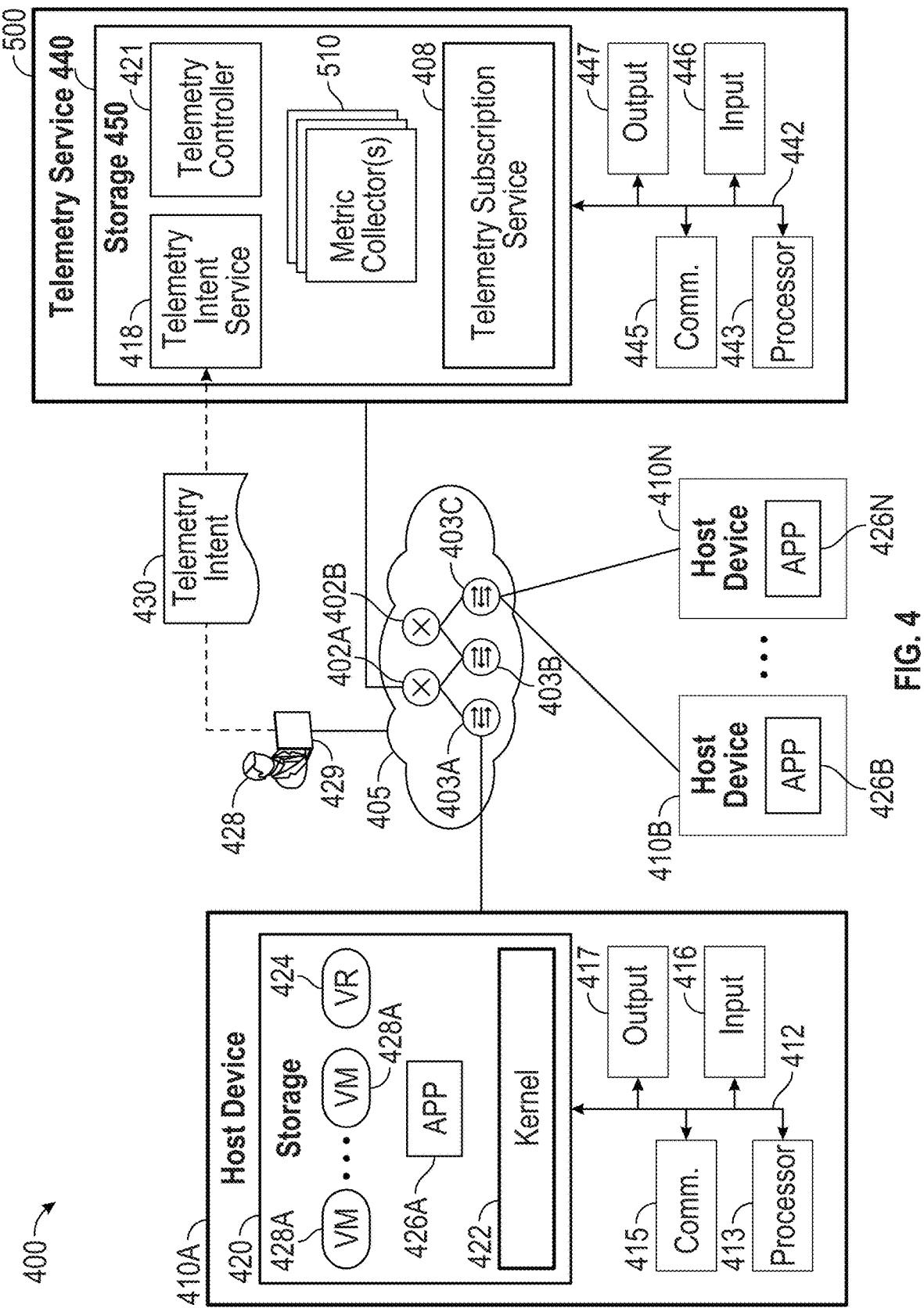
FIG. 4 is a block diagram illustrating an example performance monitoring service with a telemetry service including a telemetry collection service in a network and/or within a data center, according to techniques described in this disclosure.

Edge services controller 28 may include a performance monitoring system (shown in more detail in FIGS. 5, 6, 9, and 12) with a collector for collecting telemetry data and an alert rule evaluator service to analyze the telemetry data according to alert rules that determine if an alarm should be generated based on the telemetry data, as further explained below. The performance monitoring system may also include a telemetry service, such as shown in FIG. 4, which may include metric collector and allow for users to create alert rules for network monitoring. A performance monitoring system may include one or more machine learning components and may be configured to provide adaptive sampling intervals for collecting telemetry data, to provide adaptive rule evaluation intervals, and/or to provide recommendations for alert rules that provide improved insight into a network.

Servers 12A and 12X are directly coupled to TOR switches 16, and servers 12B, 12D, and 12C are not directly coupled to TOR switches in the illustrated example. Servers 12B, 12D, and 12C may reach TOR switches 16 and IP fabric 20 via servers 12A or 12X. Switch fabric 14 in the illustrated example includes interconnected top-of-rack (TOR) (or other "leaf") switches 16A-16N coupled to a distribution layer of chassis (or "spine" or "core") switches 18A-18M (herein, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 may in some cases provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. The source port refers to transport layer (e.g., TCP/UDP) ports. A "port" may refer to a physical network interface of a NIC.

Each of servers 12 may be a compute node, an application server, a storage server, or other type of server. For example, each of servers 12 may represent a computing device, such as an x86 processor-based server, configured to operate according to techniques described herein. Servers 12 may provide Network Function Virtualization Infrastructure (NFVI) for an NFV architecture.

Servers 12 may host endpoints for one or more virtual networks that operate over the physical network represented here by IP fabric 20 and switch fabric 14. Although described primarily with respect to a data center-based switching network, other physical networks, such as service provider network 7, may underlay the one or more virtual networks. Endpoints may include, e.g., virtual machines, containerized applications, or applications executing natively on the operating system or bare metal.

Servers 12 each includes at least one network interface card (NIC) of NICs 13A-13X (collectively, "NICs 13"), which each include at least one port with which to exchange packets over one or more communication links coupled to NIC ports. For example, server 12A includes NIC 13A.

In some examples, each of NICs 13 provides one or more virtual hardware components for virtualized input/output (I/O). A virtual hardware component for I/O may be a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interface cards as "virtual functions" for use by respective endpoints executing on the server 12. In this way, the virtual network endpoints may share the same PCIe physical hardware resources and the virtual functions are examples of virtual hardware components. As another example, one or more servers 12 may implement Virtio, a para-virtualization framework available, e.g., for the Linux Operating System, that provides emulated NIC functionality as a type of virtual hardware component. As another example, one or more servers 12 may implement Open vSwitch to perform distributed virtual multilayer switching between one or more virtual NICs (vNICs) for hosted virtual machines, where such vNICs may also represent a type of virtual hardware component. In some instances, the virtual hardware components are virtual I/O (e.g., NIC) components. In some instances, the virtual hardware components are SR-IOV virtual functions and may provide SR-IOV with Data Plane Development Kit (DPDK)-based direct process user space access.

In some examples, including the illustrated example of FIG. 1, one or more of NICs 13 may include multiple ports. NICs 13 may be connected to one another via ports of NICs 13 and communications links to form a NIC fabric 23 having a NIC fabric topology. NIC fabric 23 is the collection of NICs 13 connected to at least one other of NIC 13s and communications links coupling NICs 13 to one another.

NICs 13 each includes a processing unit 25 to offload aspects of the datapath. The processing unit in the NIC may be, e.g., a multi-core ARM processor with hardware acceleration provided by a Data Processing Unit (DPU), Field Programmable Gate Array (FPGA), and/or an ASIC. NICs 13 may alternatively be referred to as SmartNICs or GeniusNICs.

In accordance with various aspects of the techniques described in this disclosure, an edge services platform leverages processing units 25 of NICs 13 to augment the processing and networking functionality of switch fabric 14 and/or servers 12 that include NICs 13.

Figure 6:
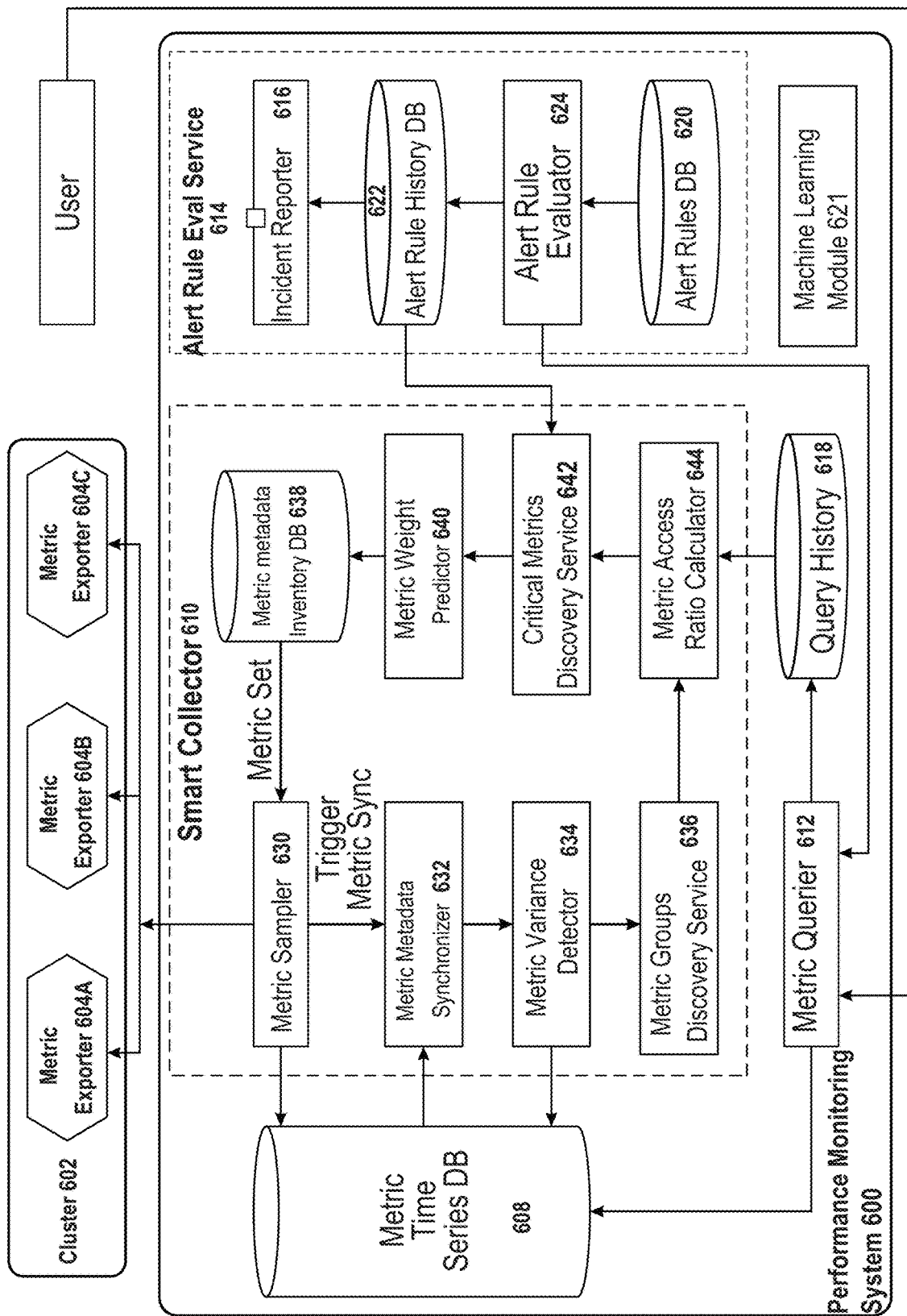
FIG. 6 illustrates an example of a performance monitoring system having a smart collector, according to techniques described in this disclosure.
Figure 9:
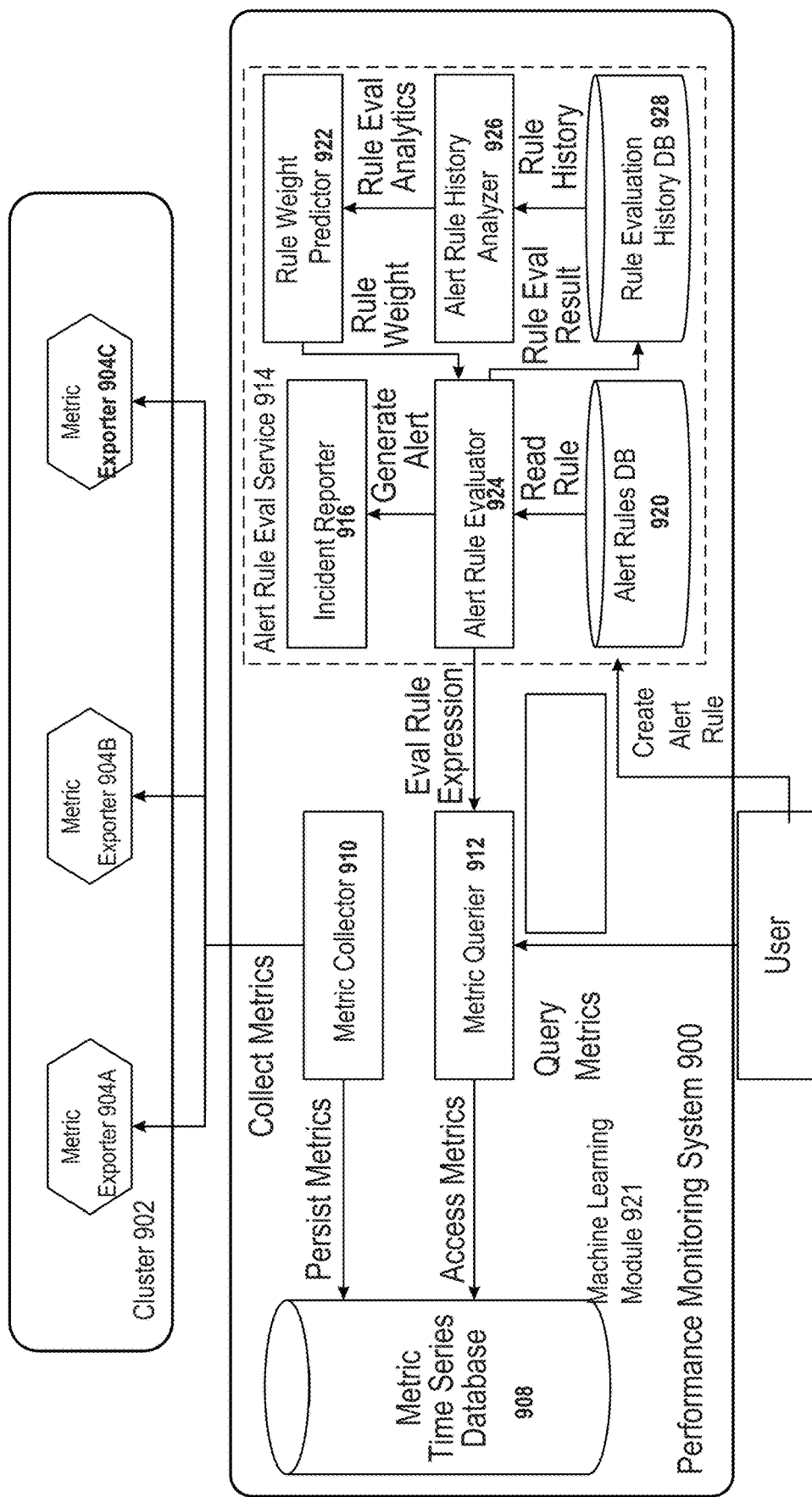
FIG. 9 is an example of a performance monitoring system that adjusts rule evaluation intervals, according to techniques described in this disclosure.
Figure 12:
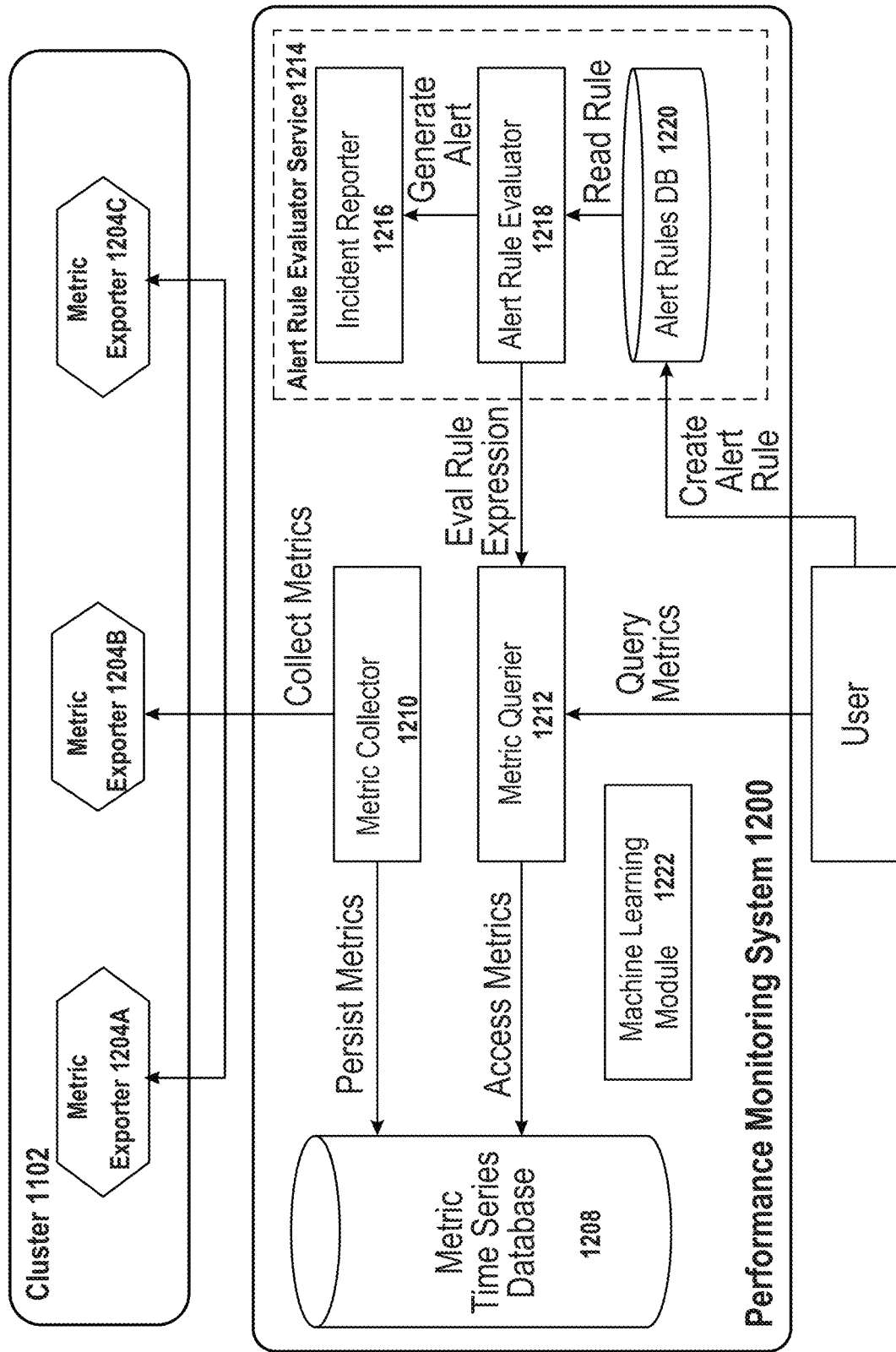
FIG. 12 is an example of a performance monitoring system for recommending rules, according to techniques described in this disclosure.

Additionally, edge services controller 28 may manage API driven deployment of services 233 on NICs 13; NIC 13 addition, deletion and replacement within the edge services platform; monitoring of services 233 and other resources on NICs 13; and management of connectivity between various services 233 running on the NICs 13. Additionally, edge services controller 28 may include a performance monitoring system 500 and telemetry service 440 (shown in FIG. 3), which may act to collect metrics from DPUs 25 using pull or push type queries. Performance monitoring system 500 may take various forms, such as shown in FIGS. 6, 9, and 12 as performance monitoring systems 600, 900, and 1200.

Edge services controller 28 may communicate information describing services available on NICs 13, a topology of NIC fabric 23, or other information about the edge services platform to an orchestration system (not shown) of network controller 24. Example orchestration systems include OpenStack, vCenter by VMWARE, or System Center by MICROSOFT. Example network controllers 24 include a controller for Contrail by JUNIPER NETWORKS or Tungsten Fabric. Network controller 24 may be a network fabric manager. Additional information regarding a controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each of which is incorporated by reference as if fully set forth herein.

In some examples, edge services controller 28 may program processing units 25 to provide telemetry data when requested. Edge services controller 28 also performs performance monitoring functions including evaluating metrics, evaluating acquired telemetry data according to alert rules and using machine learning to determine optimized telemetry data collection rates, rule evaluation rates, and provide alert rule recommendations.

Figure 2:
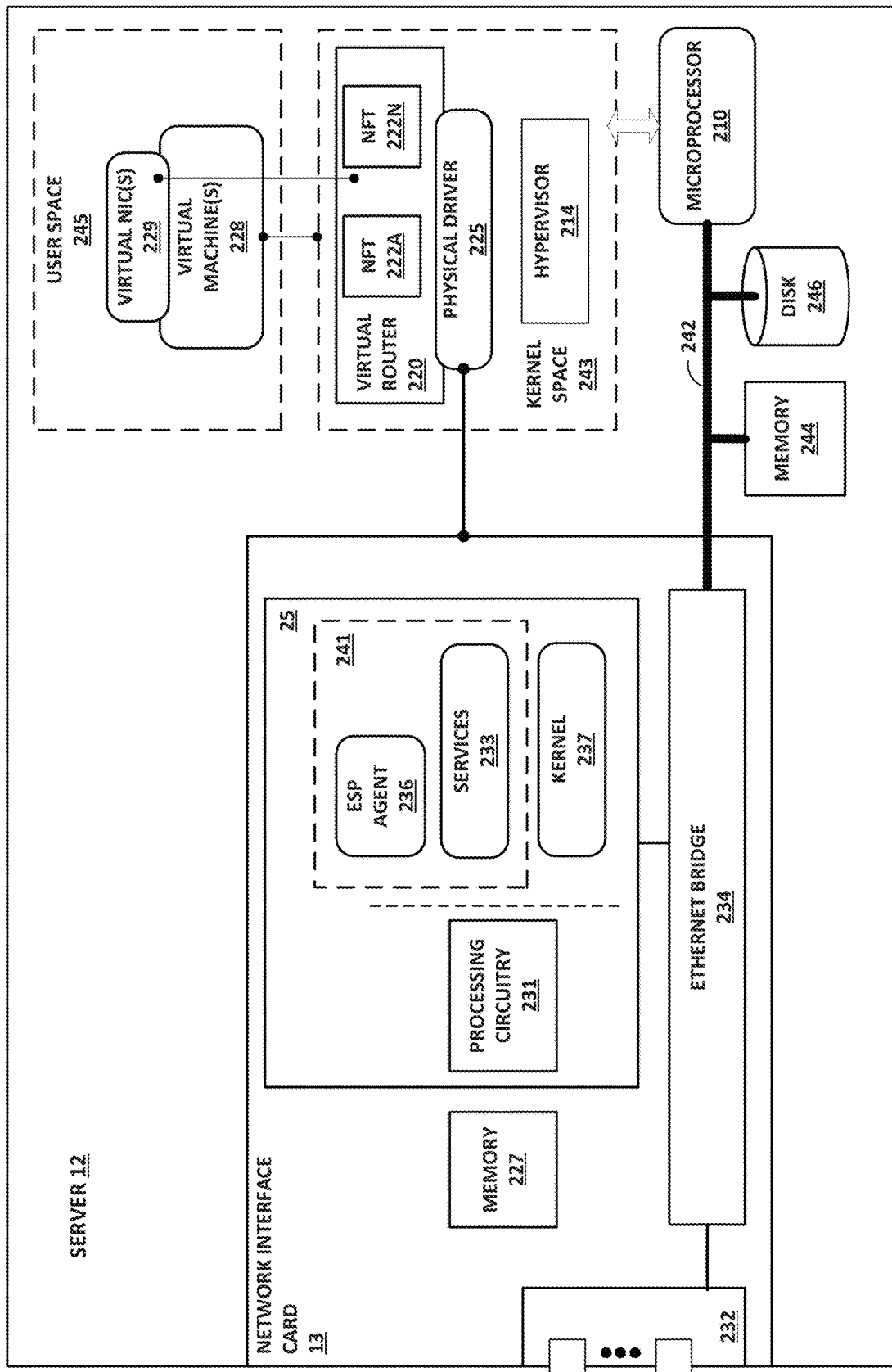
FIG. 2 is a block diagram illustrating an example computing device that uses a network interface card having a separate processing unit, to perform services managed by an edge services controller according to techniques described herein.

FIG. 2 is a block diagram illustrating an example server 12 that uses a network interface card having a separate processing unit, to perform services managed by an edge services platform according to techniques described herein. Server 12 of FIG. 2 may represent a real or virtual server and may represent an example instance of any of servers 12A-12X of FIG. 1. Server 12 includes, in this example, a bus 242 coupling hardware components of server 12, such as SR-IOV-capable network interface card (NIC) 13, storage disk 246, and microprocessor 210. A front-side bus may in some cases couple microprocessor 210 and memory device 244. In some examples, bus 242 may couple memory device 244, microprocessor 210, and NIC 13. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit ("processing core") to perform instructions that conform to an instruction set architecture. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Network interface card (NIC) 13 includes one or more interfaces 232 configured to exchange packets using links of an underlying physical network. Interfaces 232 may include a port interface card having one or more network ports. NIC 13 also include an on-card memory 227 to, e.g., store packet data. Direct memory access transfers between the NIC 13 and other devices coupled to bus 242 may read/write from/to the memory 227.

Memory 244, NIC 13, storage disk 246, and microprocessor 210 provide an operating environment for a software stack that may execute a hypervisor 214 and one or more virtual machines 228 managed by hypervisor 214.

In general, a virtual machine provides a virtualized/guest operating system for executing applications in an isolated virtual environment. Because a virtual machine is virtualized from physical hardware of the host server, executing applications are isolated from both the hardware of the host and other virtual machines.

An alternative to virtual machines is the virtualized container, such as those provided by the open-source DOCKER Container application. Like a virtual machine, each container is virtualized and may remain isolated from the host machine and other containers. However, unlike a virtual machine, each container may omit an individual operating system and provide only an application suite and application-specific libraries. A container is executed by the host machine as an isolated user-space instance and may share an operating system and common libraries with other containers executing on the host machine. Thus, containers may require less processing power, storage, and network resources than virtual machines. As used herein, containers may also be referred to as virtualization engines, virtual private servers, silos, or jails. In some instances, the techniques described herein with respect to containers and virtual machines or other virtualization components.

While virtual network endpoints in FIG. 2 are illustrated and described with respect to virtual machines, other operating environments, such as containers (e.g., a DOCKER container) may implement virtual network endpoints. An operating system kernel (not shown in FIG. 2) may execute in kernel space 243 and may include, for example, a Linux, Berkeley Software Distribution (BSD), another Unix-variant kernel, or a Windows server operating system kernel, available from MICROSOFT.

Server 12 executes a hypervisor 214 to manage virtual machines 228. Example hypervisors include Kernel-based Virtual Machine (KVM) for the Linux kernel, Xen, ESXi available from VMWARE, Windows Hyper-V available from MICROSOFT, and other open-source and proprietary hypervisors. Hypervisor 214 may represent a virtual machine manager (VMM).

Virtual machines 228 may host one or more applications, such as virtual network function instances. In some examples, a virtual machine 228 may host one or more VNF instances, where each of the VNF instances is configured to apply a network function to packets.

Hypervisor 214 includes a physical driver 225 to use a physical function provided by network interface card 13. In some cases, network interface card 13 may also implement SR-IOV to enable sharing the physical network function (I/O) among virtual machines 228. Each port of NIC 13 may be associated with a different physical function. The shared virtual devices, also known as virtual functions, provide dedicated resources such that each of virtual machines 228 (and corresponding guest operating systems) may access dedicated resources of NIC 13, which therefore appears to each of virtual machines 228 as a dedicated NIC. Virtual functions 217 may be lightweight PCIe functions that share physical resources with the physical function and with other virtual functions. NIC 13 may have thousands of available virtual functions according to the SR-IOV standard, but for I/O-intensive applications the number of configured virtual functions is typically much smaller.

Virtual machines 228 include respective virtual NICs 229 presented directly into the virtual machine 228 guest operating system, thereby offering direct communication between NIC 13 and the virtual machine 228 via bus 242, using the virtual function assigned for the virtual machine. This may reduce hypervisor 214 overhead involved with software-based, VIRTIO and/or vSwitch implementations in which hypervisor 214 memory address space of memory 244 stores packet data and packet data copying from the NIC 13 to the hypervisor 214 memory address space and from the hypervisor 214 memory address space to the virtual machines 228 memory address space consumes cycles of microprocessor 210.

NIC 13 may further include a hardware-based Ethernet bridge or embedded switch 234. Ethernet bridge 234 may perform layer 2 forwarding between virtual functions and physical functions of NIC 13. Bridge 234 thus in some cases provides hardware acceleration, via bus 242, of inter-virtual machine 228 packet forwarding and of packet forwarding between hypervisor 214, which accesses the physical function via physical driver 225, and any of virtual machines 228. The embedded switch 234 may be physically separate from processing unit 25.

Server 12 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. At least some functions of virtual router may be performed as one of services 233.

In the example computing device/server 12 of FIG. 2, virtual router 220 executes within hypervisor 214 that uses physical functions for I/O, but virtual router 220 may execute within a hypervisor, a host operating system, a host application, one of virtual machines 228, and/or processing unit 25 of NIC 13.

In general, each virtual machine 228 may be assigned a virtual address for use within a corresponding virtual network, where each of the virtual networks may be associated with a different virtual subnet provided by virtual router 220. A virtual machine 228 may be assigned its own virtual layer three (L3) IP address, for example, for sending and receiving communications but may be unaware of an IP address of the server 12 on which the virtual machine is executing. In this way, a "virtual address" is an address for an application that differs from the logical address for the underlying, physical computer system, e.g., server 12.

In one implementation, server 12 includes a virtual network (VN) agent (not shown) that controls the overlay of virtual networks for server 12 and that coordinates the routing of data packets within server 12. In general, a VN agent communicates with a virtual network controller for the multiple virtual networks, which generates commands to control routing of packets. A VN agent may operate as a proxy for control plane messages between virtual machines 228 and virtual network controller, such as controller 24 or 28. For example, a virtual machine may request to send a message using its virtual address via the VN agent, and VN agent may in turn send the message and request that a response to the message be received for the virtual address of the virtual machine that originated the first message. In some cases, a virtual machine 228 may invoke a procedure or function call presented by an application programming interface of VN agent, and the VN agent may handle encapsulation of the message as well, including addressing.

In one example, network packets, e.g., layer three (L3) IP packets or layer two (L2) Ethernet packets generated or consumed by the instances of applications executed by virtual machine 228 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE (MPLSoGRE), MPLS over User Datagram Protocol (UDP) (MPLSoUDP), etc.

As noted above, a virtual network controller may provide a logically centralized controller for facilitating operation of one or more virtual networks. The virtual network controller may, for example, maintain a routing information base, e.g., one or more routing tables that store routing information for the physical network as well as one or more overlay networks. Virtual router 220 of hypervisor 214 implements a network forwarding table (NFT) 222A-222N for N virtual networks for which virtual router 220 operates as a tunnel endpoint. In general, each NFT 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of NFTs 222 may be an NFT for a different routing instance (not shown) implemented by virtual router 220.

In accordance with techniques described in this disclosure, an edge services platform including, for example, edge services controller 28, leverages processing unit 25 of NIC 13 to augment the processing and networking functionality of server 12. Processing unit 25 includes processing circuitry 231 to execute services orchestrated by edge services controller 28. Processing circuitry 231 may represent any combination of processing cores, ASICs, FPGAs, or other integrated circuits and programmable hardware. In an example, processing circuitry may include a System-on-Chip (SoC) having, e.g., one more cores, a network interface for high-speed packet processing, one or more acceleration engines for specialized functions (e.g., security/cryptography, machine learning, storage), programmable logic, integrated circuits, and so forth. Such SoCs may be referred to as data processing units (DPUs). DPUs may be examples of processing unit 25.

In the example NIC 13, processing unit 25 executes an operating system kernel 237 and a user space 241 for services. Kernel 237 may be a Linux kernel, a Unix or BSD kernel, a real-time OS kernel, or other kernel for managing hardware resources of processing unit 25 and managing user space 241.

Services 233 may include network, security, storage, data processing, co-processing, machine learning, telemetry (such as telemetry services 233 of FIG. 3), and/or other services. Services 233 and ESP agent 236 may include executable instructions. Processing unit 25 may execute services 233 and edge service platform (ESP) agent 236 as processes and/or within virtual execution elements such as containers or virtual machines. As described elsewhere herein, services 233 may augment the processing power of the host processors (e.g., microprocessor 210) by, e.g., enabling the server 12 to offload packet processing, security, or other operations that would otherwise be executed by the host processors.

Processing unit 25 executes edge service platform (ESP) agent 236 to exchange data and control data with an edge services controller 28 for the edge service platform. While shown in user space 241, ESP agent 236 may be a kernel module of kernel 237 in some instances.

As an example, ESP agent 236 may collect and send, to the ESP controller (which is another way of referring to edge services controller 28 shown in the example of FIG. 1), telemetry data generated by services 233, the telemetry data describing traffic and/or availability of resources in the network, the server 12, and/or the processing unit 25 (such as memory or processor and/or core utilization). As another example, ESP agent 236 may receive, from the ESP controller, service code to execute any of services 233, service configuration to configure any of services 233, packets or other data for injection into the network.

Edge services controller 28 manages the operations of processing unit 25 by, e.g., orchestrating and configuring services 233 that are executed by processing unit 25; deploying services 233; NIC 13 addition, deletion and replacement within the edge services platform; monitoring of services 233 and other resources on NIC 13; and management of connectivity between various services 233 running on NIC 13. Example resources on NIC 13 include memory 227 and processing circuitry 231.

Figure 3:
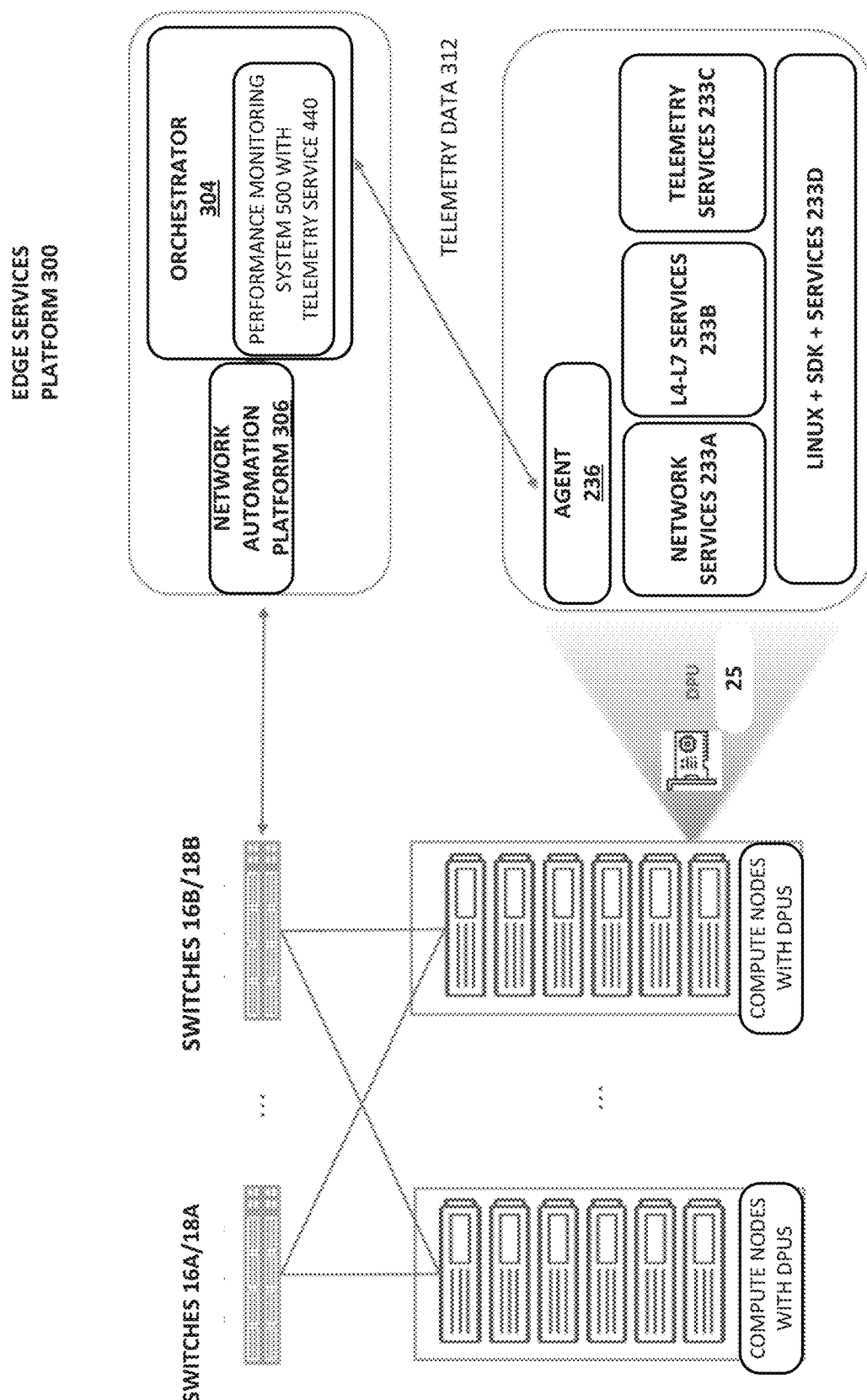
FIG. 3 is a conceptual diagram illustrating a data center with servers that each include a network interface card having a separate processing unit, controlled by an edge services controller, according to techniques described in this disclosure.

FIG. 3 is a conceptual diagram illustrating a data center with compute nodes that each include a network interface card having a separate processing unit, controlled by an edge services platform 300, according to techniques described in this disclosure. Edge services platform 300 may include network automation platform 306 and orchestrator 304. Racks of compute nodes may correspond to servers 12 of FIG. 1, and switches 16A/18A and 16B/18B may correspond to the switches 16 and 18 of fabric 14 of FIG. 1. Processing unit 25, illustrated as a data processing unit (DPU), may include agent 236 and services (such as services 233 of FIG. 2), which may represent software. Services 233 executed by processing unit 25 may include network services 233A, L4-L7 services 233B, telemetry services 233C, and Linux+ SDK (software development kit) services 233D.

As described more fully herein, processing unit 25 may send, via agent 236 and telemetry services 233C, telemetry data (shown as telemetry data 312) and other information for the NIC that includes that processing unit to orchestrator 304 of edge services platform 300. Orchestrator 304 may represent an example of edge services controller 28 of FIG. 1 and may include performance monitoring system 500 (shown in more detail in FIG. 5) including telemetry service 440 (shown in more detail in FIG. 4). Performance monitoring system 500 may receive, via telemetry service 440, telemetry data comprising metrics from a large number of agents 236 associated with a large number of hosts (which is another way to refer to servers 12).

Network automation platform 306, which may represent an example of controller 24 of FIG. 1, connects to and manages network devices (e.g., servers 12 and/or switches 16/18) and orchestrator 304. Network automation platform 306 may, for example, deploy network device configurations and manage the network. Performance monitoring system 500 may extract telemetry, and analyze and provide indications of the network status. Various APIs may provide a user interface with the network automation platform and/or performance monitoring system, to enable, for example, intent based policies with respect to network operation and performance to be entered and to be automatically configured.

FIG. 4 illustrates a scalable, microservice based telemetry service 440 that can collect time-series telemetry data from computing devices, such as via agent 236 of FIG. 3, and make the telemetry data available to different consumers through a subscription service. Telemetry service 440 may be part of performance monitoring system 500, or part of controller 28 or controller 24. Consumers of the telemetry data can be other shared services included in performance monitoring system 500, such as more fully illustrated in FIG. 5.

An administrator or application can express telemetry collection requirements as an "intent" that defines how telemetry is to be collected in a high level "natural language." A telemetry intent compiler can receive the telemetry intent and translate the high-level intent into abstract telemetry configuration parameters that provide a generic description of desired telemetry data, also referred to as metrics or performance measures. The telemetry service 440 can determine, from the telemetry intent, a set of devices from which to collect telemetry data. For each device, the telemetry service can determine capabilities of the device with respect to telemetry data collection. The capabilities may include a telemetry protocol supported by the device. The telemetry service can create a protocol specific device configuration based on the abstract telemetry configuration parameters and the telemetry protocol supported by the device. Devices in a network system that support a particular telemetry protocol can be allocated to instances of a telemetry collector (metric collector) that supports the telemetry protocol in a distributed manner.

The telemetry service 440 can be implemented as a collection of microservices that may be fault tolerant and scalable. New instances of a microservice may be created in response to growing demand for telemetry collection services.

In particular, example data center 400 may include telemetry service 440 in network 405 and/or within one or more data centers. Data center 400 of FIG. 4 may be described as an example or alternative implementation of data center 10 of FIG. 1. One or more aspects of FIG. 4 may be described herein within the context of FIG. 1.

Although a data center, such as that illustrated in FIG. 1 and FIG. 4 may be operated by any entity, some data centers are operated by a service provider, where the business model of such a service provider may involve providing computing capacity to customers or clients, often with co-tenancy. For this reason, data centers usually contain a huge number of compute nodes, or host devices. In order to operate efficiently, those hosts have to be connected to each other and to the external world, and that ability is provided through physical devices, which may be interconnected in a leaf-spine topology. The collection of these physical devices, such as network devices and host devices, form the underlay network.

In some examples, data center 10 may represent one of many geographically distributed network data centers. In the example of FIG. 4, data center 400 includes a set of storage systems, application servers, compute nodes, or other devices, including device 410A through device 410N (collectively "devices 410," representing any number of devices). Devices 410 may be interconnected via high-speed switch fabric 14 of FIG. 1 provided by one or more tiers of physical network switches and routers.

Devices 410 may represent any of a number of different types of devices (core switches, spine network devices, leaf network devices, edge network devices, or other network devices), but in some examples, one or more devices 410 may represent physical compute nodes and/or storage nodes of the data center. For example, one or more of devices 410 may provide an operating environment for execution of one or more customer-specific applications or services. Alternatively, or in addition, one or more of devices 410 may provide an operating environment for one or more virtual machines or other virtualized instances, such as containers. In some examples, one or more of devices 410 may be alternatively referred to as a host computing device, a host, or a server. A device 410 may thereby execute one or more virtualized instances, such as virtual machines, containers, or other virtual execution environment for running one or more applications or services, such as virtualized network functions (VNFs).

In general, each of devices 410 may be any type of device that may operate on a network and which may generate data (e.g. connectivity data, flow data, sFlow data, resource utilization data) accessible through telemetry or otherwise, which may include any type of computing device, sensor, camera, node, surveillance device, or other device. Further, some or all of devices 410 may represent a component of another device, where such a component may generate data collectible through telemetry or otherwise. For example, some or all of devices 410 may represent physical or virtual devices, such as switches, routers, hubs, gateways, security devices such as firewalls, intrusion detection, and/or intrusion prevention devices.

Telemetry service 440 can configure devices 410 (and/or other devices) to generate and provide telemetry data related to the operations of those devices. Such data can include process usage data, memory usage data, network usage data, error counts etc. Telemetry service 440 can be configured to collect the telemetry data from devices 410 using protocols supported by the devices 410. Applications, processes, threads, etc. can subscribe to the collected telemetry data in order to be notified when telemetry data is available for a device or devices supporting a network.

User interface device 429 may be implemented as any suitable device for presenting output and/or accepting user input. For instance, user interface device 429 may include a display. User interface device 429 may be a computing system, such as a mobile or non-mobile computing device operated by a user and/or by administrator 428. In some examples, user interface device 429 may be physically separate from and/or in a different location than controller 24. In such examples, user interface device 429 may communicate with controller 24 over a network or other means of communication. In other examples, user interface device 149 may be a local peripheral of controller 24 or 28, or may be integrated into controller 24 or 28.

In some aspects, user interface device 429 may communicate with telemetry service 440 or a component thereof to configure the telemetry service 440 to configure devices to provide telemetry data using high-level statements of intent and to receive telemetry data from devices and other components of data center 10 via telemetry service 440. In some aspects, telemetry service 440 may be configured by applications or services that use telemetry data obtained via telemetry service 440. For example, a performance monitoring system 500 of FIG. 5 or components thereof may configure telemetry service 440 to collect and provide telemetry data from devices 410, such as at a desired collection rate. In some cases, telemetry data comprises metrics (measures of performance) for different aspects of host devices, which may be collected for each metric as a series of metric values, the metric values obtained at each of a plurality of specified times according to a specified sampling rate and associated with the metric name of the corresponding metric.

Telemetry service 440 provides a sharable telemetry data collection service to collect telemetry data from multiple devices in a network system according to a protocol supported by the device. The collected telemetry data can be used to perform anomaly detection and alarm generation for cloud computing infrastructure monitoring that can be used by multiple applications and tenants at a cloud scale.

An administrator 128 can utilize UI device 129 to input data expressing a telemetry collection requirement as an "intent" defined in a high level "natural language." Telemetry service 440 can receive the data representing the intent and translate the high-level intent into abstract telemetry configuration parameters that can be programmatically processed by a telemetry controller of telemetry service 440. The telemetry controller can create a protocol specific telemetry configuration for a device based on the abstract telemetry configuration parameters and the telemetry protocols supported by the device.

As mentioned above, in some cases, a client of the data center may experience network issues such as increased latency, packet loss, low network throughput, or slow workload processing. Troubleshooting such issues may be complicated by the deployment of workloads in a large multi-tenant data center. Telemetry data such as that provided by telemetry service 440 may be used to facilitate troubleshooting in a data center.

In the example of FIG. 4, network 405 connects telemetry service 440, host device 410A, and host devices 410B-410N. Host devices 410A, 410B, through 410N may be collectively referenced as "host devices 410," representing any number of host devices 410.

Each of host devices 410 may be an example of devices 12N of FIG. 1, but in the example of FIG. 4, each of host devices 410 is implemented as a server or host device that operates as a physical or virtualized compute node or a storage node of a virtualized data center, as opposed to a network device. As further described herein, one or more of host devices 410 (e.g., host device 410A of FIG. 4) may execute multiple virtual computing instances, such as virtual machines 428, and in addition, one or more of host devices 410 (e.g., one or more of host devices 410B through 410N) may execute applications or service modules on a non-virtualized, single-tenant, and/or bare metal server. Accordingly, the example of FIG. 4 illustrates a network system that may include a mix of virtualized server devices and bare metal server devices.

Also connected is user interface device 129, which may be operated by administrator 128. In some examples, user interface device 129 may present, at a display device associated with user interface device 129, one or more user interfaces.

Network 405 may correspond to any of switch fabric 14 and/or service provider network 7 of FIG. 1, or alternatively, may correspond to a combination of switch fabric 14, service provider network 7, and/or another network. Although not shown in FIG. 4, network 405 may also include some of the components of FIG. 1, SDN controller 24, and edge services controller 28.

Illustrated within network 405 are spine devices 402A and 402B (collectively "spine devices 402" and representing any number of spine devices 402), as well as leaf device 403A, 403B, and leaf device 403C (collectively "leaf devices 403" and also representing any number of leaf devices 403). Although network 405 is illustrated with spine devices 402 and leaf devices 403, other types of devices may be included in network 405, including core switches, edge devices, top-of-rack devices, and other devices, such as those illustrated in FIG. 1.

In general, network 405 may be the internet, or may include or represent any public or private communications network or other network. For instance, network 405 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 405 using any suitable communication techniques. Network 405 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 4 may be operatively coupled to network 405 using one or more network links. The links coupling such devices or systems to network 405 may be Ethernet, Asynchronous Transfer Mode (ATM) or other types of network connections, and such connections may be wireless and/or wired connections. One or more of the devices or systems illustrated in FIG. 4 or otherwise on network 405 may be in a remote location relative to one or more other illustrated devices or systems.

Each of host devices 410 represents a physical computing device or compute node or storage node that provides an execution environment for virtual hosts, virtual machines, containers, and/or other real or virtualized computing resources. In some examples, each of host devices 410 may be a component of a cloud computing system, server farm, and/or server cluster (or portion thereof) that provides services to client devices and other devices or systems.

Certain aspects of host devices 410 are described herein with respect to host device 410A. Other host devices 410 (e.g., host device 410B through 410N) may be described similarly, and may also include like-numbered components that may represent the same, similar, or corresponding components, devices, modules, functionality, and/or other features.

Descriptions herein with respect to host device 410A may therefore correspondingly apply to one or more other host devices 410 (e.g., host device 410B through host device 410N).

In the example of FIG. 4, host device 410A includes underlying physical compute hardware that includes one or more processors 413, one or more communication units 415, one or more input devices 416, one or more output devices 417, and one or more storage devices 420. In the example shown, storage devices 420 may include kernel module 422 and virtual router module 424. Storage devices 420 may also include virtual machines 428A through 428N (collectively "virtual machines 428" and representing any number of virtual machines 428), when present, may execute on top of a hypervisor (not shown) or may be controlled by a hypervisor. One or more of the devices, modules, storage areas, or other components of host device 410A may be interconnected to enable inter-component communications (physically, communicatively, and/or operatively). In some examples, such connectivity may be provided by through communication channels (e.g., communication channels 412), a system bus, a network connection, an inter-process communication data structure, or any other method for communicating data.

Processor 413 may implement functionality and/or execute instructions associated with host device 410A. Communication unit 415 may communicate with other devices or systems on behalf of host device 410A. One or more input devices 416 and output devices 417 may represent any other input and/or output devices associated with host device 410A. Storage devices 420 may store information for processing during operation of host device 410A.

Virtual router module 424 may execute multiple routing instances for corresponding virtual networks within data center 10 (FIG. 1) and may route packets to appropriate virtual machines executing within the operating environment provided by devices 410. Virtual router module 424 may also be responsible for collecting overlay flow data, such as Contrail Flow data when used in an infrastructure in which the Contrail SDN is employed.

Virtual machine 428A through virtual machine 428N (collectively "virtual machines 428," representing any number of virtual machines 428) may represent example instances of virtual machines 428. Host device 410A may partition the virtual and/or physical address space provided by storage device 420 into user space for running user processes. Host device 410A may also partition virtual and/or physical address space provided by storage device 420 into kernel space, which is protected and may be inaccessible by user processes.

Each of virtual machines 428 may represent a tenant virtual machine running customer applications such as Web servers, database servers, enterprise applications, or hosting virtualized services used to create service chains. In some cases, any one or more of host devices 410 or another computing device hosts customer applications directly, i.e., not as virtual machines (e.g., one or more of host devices 410B through 410N, such as host device 410B and host device 410N). Although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on host devices 410.

In the example of FIG. 4, one or more processors 443 may implement telemetry service 440, which may be stored in memory, such as storage devices 450, to perform the operations attributed to telemetry service 440 herein. Telemetry service 440 may include one or more communication units 445, one or more input devices 446, and one or more output devices 447 Storage devices 450 may include intent service 418, telemetry controller 421, telemetry subscription service 408, and telemetry collectors 510.

One or more of the devices, modules, storage areas, or other components of telemetry service 440 may be interconnected to enable inter-component communications (physically, communicatively, and/or operatively). In some examples, such connectivity may be provided by way of one or more of communication channels (e.g., communication channels 442), a system bus, a network connection, an inter-process communication data structure, or any other method for communicating data.

One or more processors 443 may be part of the NICs of FIG. 1, and/or may include processing circuitry that performs operations in accordance with one or more aspects of the present disclosure. Examples of processors 443 include microprocessors, application processors, display controllers, auxiliary processors, one or more sensor hubs, and any other hardware configured to function as a processor, a processing unit, or a processing device.

One or more communication units 445 of telemetry service 440 may communicate with devices external to telemetry service 440 by transmitting and/or receiving data, and may operate, in some respects, as both an input device and an output device. In some examples, communication unit 445 may communicate with other devices over a network, such as orchestrator 304 and agent 302 shown in the example of FIG. 3.

One or more storage devices 450 within service 440 may store information for processing during operation of service 440. Storage devices 450 may store program instructions and/or data associated with one or more of the modules described in accordance with one or more aspects of this disclosure. One or more processors 443 and one or more storage devices 450 may provide an operating environment or platform for such modules, which may be implemented as software, but may in some examples include any combination of hardware, firmware, and software. One or more processors 443 may execute instructions and one or more storage devices 450 may store instructions and/or data of one or more modules. The combination of processors 443 and storage devices 450 may retrieve, store, and/or execute the instructions and/or data of one or more applications, modules, or software. Processors 443 and/or storage devices 450 may also be operably coupled to one or more other software and/or hardware components, including, but not limited to, one or more of the components of alarm service 440 and/or one or more devices or systems illustrated as being connected to telemetry service 440.

In some examples, one or more storage devices 450 are implemented through temporary memory, which may mean that a primary purpose of the one or more storage devices is not long-term storage. Storage devices 450 of telemetry service 440 may be configured for short-term storage of information as volatile memory and therefore not retain stored contents if deactivated.

Examples of volatile memories include random access memories (RAM), dynamic random access memories (DRAM), static random access memories (SRAM), and other forms of volatile memories known in the art. Storage devices 450, in some examples, also include one or more computer-readable storage media. Storage devices 450 may be configured to store larger amounts of information than volatile memory. Storage devices 450 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Intent service 418 receives telemetry intent 430 that expresses, at a high level, telemetry requirements for generating and collecting telemetry data. The telemetry intent 430 may be in a natural language. As an example, a telemetry intent 430 may be "collect cpu resource usage metrics from all the devices at 1 minute granularity." As a further example, a telemetry intent 430 may be "collect memory resource usage from devices routerA, routerB and routerC." Intent service 418 may translate the telemetry intent 430 into one or more lower level telemetry commands and protocols that implement the telemetry intent 430. In some cases, a device may support more than one telemetry protocol. In such cases, intent service may translate the telemetry intent 430 using a protocol that may be selected according to criteria such as a priority assigned to the protocol, device capabilities with respect to the protocol, and overhead associated with the protocol. Further, in some aspects, intent service 418 may reconcile intents for multiple applications that request telemetry data from the same device. Intent service 418 can send the lower level telemetry commands (that conform to the selected protocol) and an indication of the selected protocol to telemetry controller 441 to update telemetry collection for affected devices.

Telemetry controller 441 can receive the lower level telemetry commands and an indication of the selected protocol. In some aspects, telemetry controller 441 maintains the most recent telemetry requirements for each device. Telemetry controller 441 can provision telemetry collectors 214 for devices such as leaf devices 203 and spine devices 202 that are specified by the telemetry commands and protocols as translated from telemetry intent 430.

Telemetry subscription service 408 receives requests to subscribe to telemetry data produced by devices. In some aspects, in response to receiving a subscription, telemetry controller 441 may provision telemetry collectors 510 if a telemetry collector has not already been provisioned for the device.

Telemetry collectors 510 collect telemetry data from devices. Telemetry collectors 510 can store collected data in a cache or database (not shown in FIG. 4 for ease of illustration purposes). Telemetry service 440 can provide the collected data to applications or services that have subscribed to the data.

Figure 5:
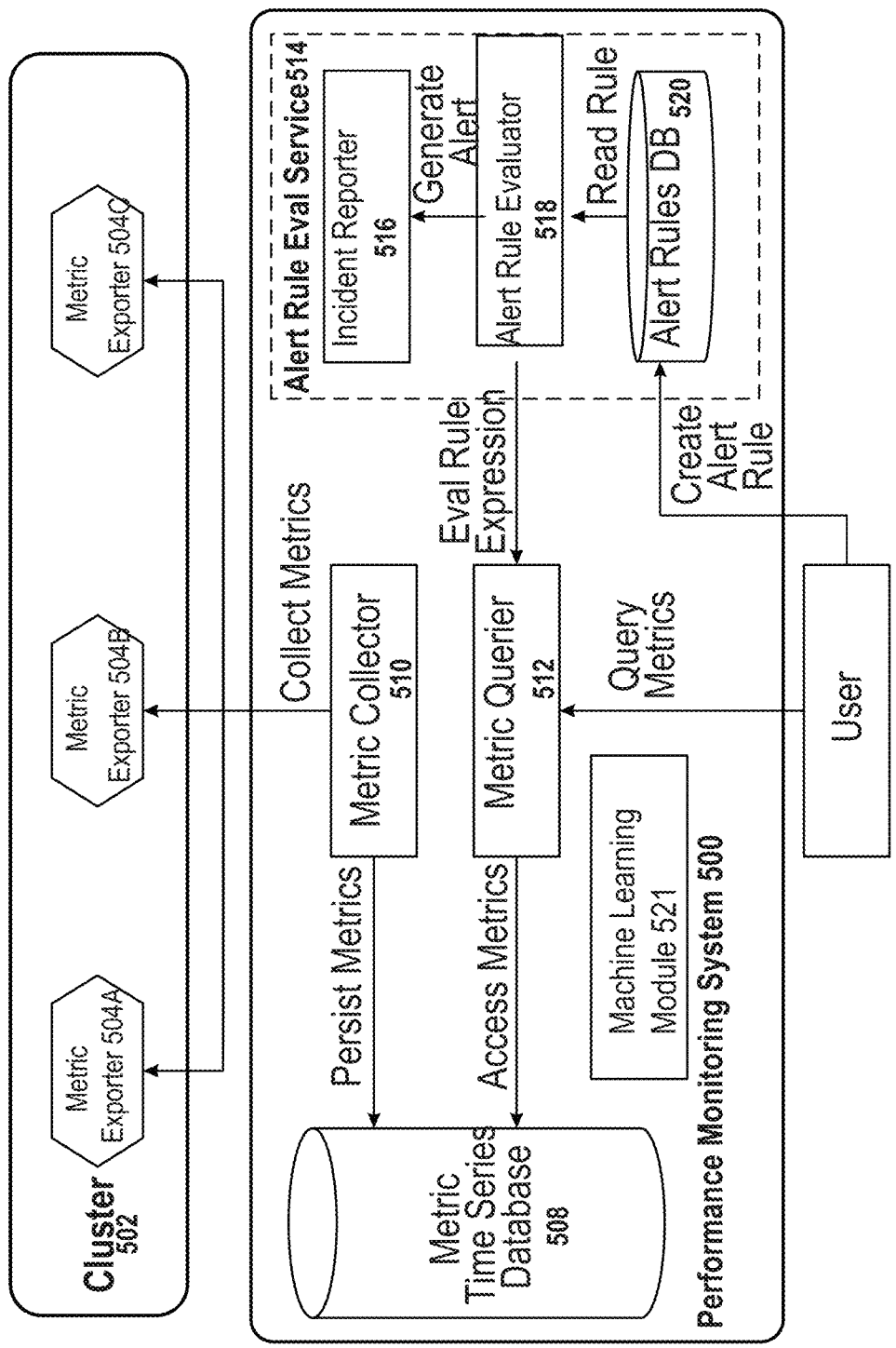
FIG. 5 illustrates a performance monitoring system in communication with metric exporters for collecting telemetry data and including an alert rule evaluator service for evaluating rules using the telemetry data, according to techniques described in this disclosure.

FIG. 5 illustrates a performance monitoring system including collectors for collecting telemetry data and a rule evaluator service for evaluating rules using the telemetry data, according to techniques described in this disclosure. As shown in FIG. 5, metric collector od performance monitoring system 500 may collect telemetry data via metric exporters 504. In examples, system 500 may be a consumer of telemetry data collected by telemetry service 440 and may implement services and rules that can be used to acquire and/or subscribe to telemetry data. Performance monitoring system 500 may analyze the telemetry data according to alert rules that determine if an alarm should be generated based on the telemetry data, as further explained below. Additionally, performance monitoring system 500 may include one or more machine learning components, such as machine learning module 521, and may be configured to provide adaptive sampling rates for collecting telemetry data, to provide adaptive rule evaluation intervals, and/or to provide recommendations for alert rules that provide improved insight into a network.

With reference to FIG. 5, the applications and services running inside a workload cluster, such as cluster 502, are configured to export, via one or more metric exporters 504A-504C, various metrics of the network to performance monitoring system 500. Performance monitoring system 500 may be an example of controller 24 and/or edge services controller 28, which may be configured to control a cluster 502 of virtual machines and communicate with multiple metric exporters 504. System 500 may include metric collector 510 for collecting telemetry data, metric time series database (TSDB) 508 for storing the telemetry data, metric querier 512 for receiving queries from a user regarding metrics, alert rule evaluator service 514 for evaluating alert rules, such as user-created rules from a user such as a network administrator. Metric collector 510, such as shown in FIG. 5, periodically discovers metric exporters 504 and collects metrics, such as by using a pull-based method wherein collection times are determined by performance monitoring system 500. The applications and services of the network expose their internal metrics through metric exporters 504, which may be agents 236 performing exporting functions. Metric exporters 504 may run either as embedded or alongside the applications/services and expose metrics using http endpoints.

More specifically, metric collector 510 may auto discover metric exporters 504 in the network (such as data center 10) and collect all the metrics exposed by those exporters. The metric collector 510 collects metrics periodically at a configured time interval, which defines a corresponding sampling rate. Previous systems generally used fixed time intervals for collecting metrics. Collected metrics comprise metric values associated with a metric name and may be persisted in metric time series database 508, wherein metrics are time-stamped. Time series data are typically stored as dense high-precision data points that may then be downsampled and aged out. In addition, TSDBs may provide features for generating sequences of aggregated values over time. When used to store time-ordered data, some examples of a time series database take advantage of the time ordered nature of the data to compress the data and reduce storage (e.g., disk or solid-state drive) footprint. Time series databases can be either SQL (relational) or NoSQL (non-relational) in architecture. NoSQL databases may better operate at scale in a cluster.

Metric querier 512 is configured to interact with time series database 508 to access collected metrics. Metric data may be accessed using a query language provided by metric querier 512, which may provide a http-based interface for users. When an issue occurs, users may manually query the collected metrics through a metric querier interface, which supports a query language to enable the user to compose complex queries and access metric data.

When a user wants to monitor a metric or a set of metrics offline or in the background, the user can automate metric monitoring by creating certain metric evaluation rules called alert rules (also called incident rules). These alert rules contain various conditions involving metrics to be evaluated against a set of threshold values. Each alert rule may contain the name of the corresponding metric, a threshold value, and a comparison condition. For example, the user may configure an alert rule to alert the user when the CPU usage metric of a system crosses 80%. These rules may be evaluated using the collected metric data on a periodic basis by alert rule evaluator service 514 at predetermined time intervals, and alerts may be generated to the user if comparison conditions are met, which is referred to as a hit herein. Alert rule evaluator service 514 includes an incident reporter 516, an alert rule evaluator 518, and an alert rules database 520. More specifically, alert rule evaluator 518 periodically reads user created rules from alert rules database 520 and evaluates the rule expression against metric data accessed through metric querier 512. The evaluation basically determines whether metric values fulfill the condition the user has specified as a rule, and if so, an alert is generated by alert rule evaluator 518 to be communicated to a user and/or stored by incident reporter 516.

When alert rule evaluator 518 evaluates a rule and determines that the comparison condition is met or is true, an alert is generated, and the rule evaluation is considered to be a rule hit, and if no alert is generated, the rule evaluation is considered to be a rule miss.

Self-Learning Metric Collector

A metric collector that uses a static, predetermined time interval, rather than dynamic time intervals (varying sampling rate) for obtaining metrics generally works well but may have the following disadvantages:

a. More storage space is required.
b. Frequently metrics are collected which are rarely accessed by a user.
c. Analyzing metrics requires more compute power because searching for relevant metrics needs to cover a large body of metric data.
d. Redundant collection of metrics can occur when metric values do not change much over time.

Therefore, a metric collector may end up collecting many less useful metrics using the same time interval as more useful metrics are collected. The above listed issues are more apparent and problematic with metric collection in a scaled network environment.

In examples, a machine learning based intelligent method is employed for using various analytics that are obtained using the telemetry data to train a machine learning model, wherein the machine learning model is employed to use additional telemetry data to make a prediction, such as a predicted metric weight, a predicted weight for a rule, or the like. With machine learning, a metric collector, such as metric collector 510, may learn how to identify the usefulness of a metric based on the relevance of that metric to the user or an alert rule evaluator service, such as alert rule evaluator service 514, may learn how to identify the relevance or weight of a metric.

For example, the relevance of a metric to user may be measured using various metric attributes which may be aggregated in some manner to determine a metric relevance value, also referred to herein as a metric weight. In examples, the higher the metric weight, the more a user is likely interested in that metric, while the lower the metric weight, the less a user is likely interested in that metric. A higher metric weight may then be used to calculate an updated sampling interval, which may cause the collector to sample that metric more frequently (i.e., with a higher metric weight, the sampling frequency is increased and the sampling interval is decreased).

FIG. 6 illustrates an example of a performance monitoring system 600 that includes smart collector 610, which leverages machine learning via machine learning module 621 to determine improved collection rates of metrics, in accordance with techniques described herein. Smart collector 610 receives metrics from metric exporters 604A-604C of cluster 602. Smart collector 610 includes metric sampler 630 for accessing metrics stored in database 608, metric metadata synchronizer 632, and metric metadata inventory database 638, wherein metric metadata may include metric relevance data and historical relevance data for each evaluated metric.

Smart collector 610 further includes metric groups discovery service 636 for discovering one or more corresponding metrics (or rules) that are related to a metric (or rule), metric weight predictor 640 for predicting a metric weight based on a machine learning model, metric variance detector 634 for determining how much a metric varies over a period of time, critical metrics discovery service 642 for determining critical metrics (or rules), and metric access ratio calculator 644 for determining access ratios for metrics and related metrics. Initially, smart collector 610 may sample all exported metrics in the network at a predetermined default sampling interval. After completion of each sampling iteration, a learning process may be triggered to learn more appropriate sampling intervals for the exported metrics using a model of machine learning module 621.

More specifically, performance monitoring system 600 may include metric time series database 608, metric querier 612, and query history database 618. Metric querier 612 is accessible by a user to query stored metrics of metric time series database 608. A query history of metric querier may be stored in query history database 618. Performance monitoring system 600 also includes alert rule evaluator service 614, which operates in a similar manner to operation of alert rule evaluator service 514 of FIG. 5, and includes incident reporter 616 for reporting alerts/incidents based on rule evaluation results, alert rule evaluator 620 for evaluating rules to generated rule evaluation results, alert rules database 620 for storing alert rules, and alert rule history database 622 for storing alert rule evaluation results including alerts/incidents.

Figure 8:
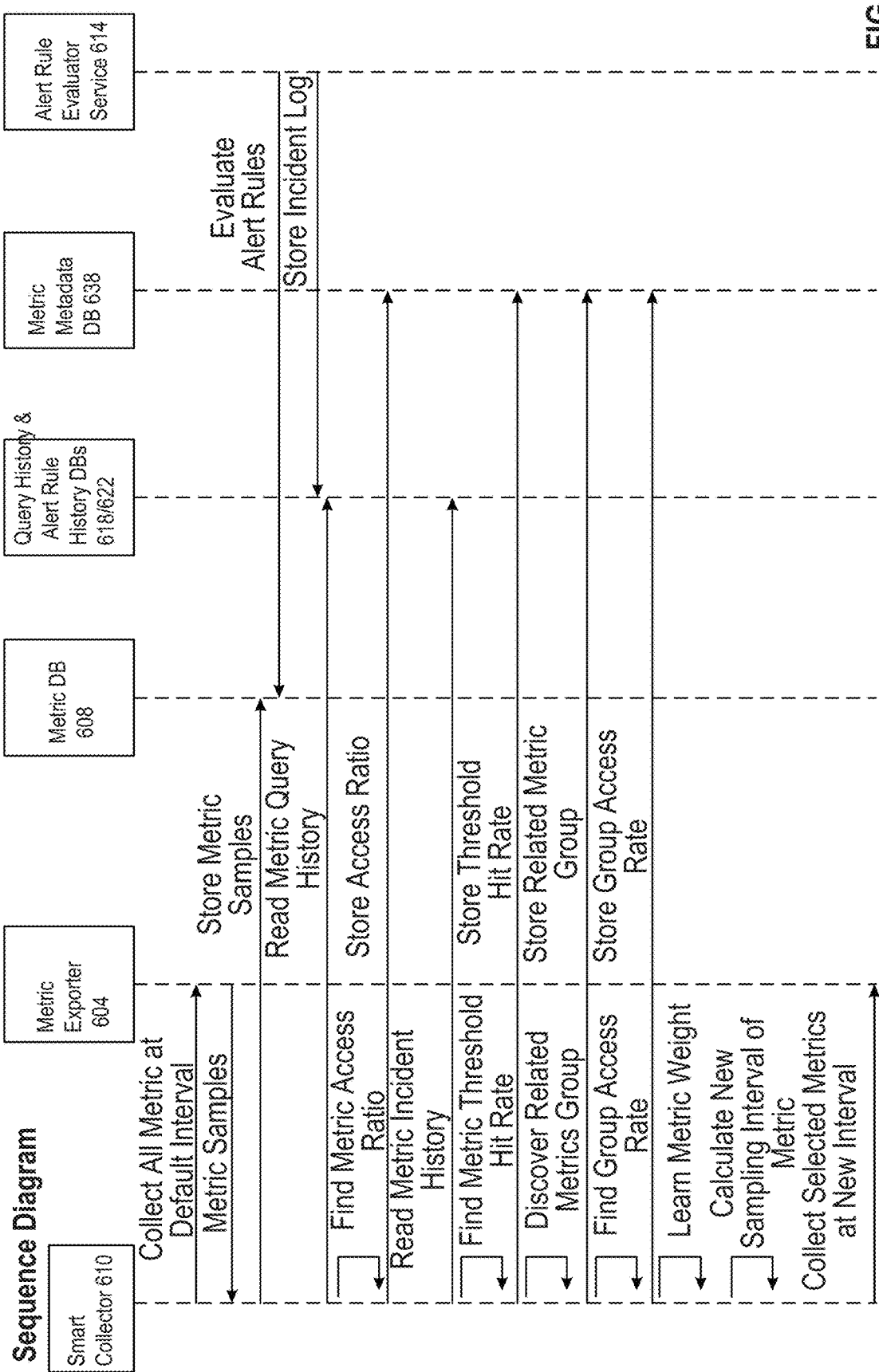
FIG. 8 is an example sequence diagram for determining new sampling intervals for metric collection, according to techniques described in this disclosure.

FIG. 8 is an example sequence diagram for determining new sampling intervals for metric collection, according to techniques described in this disclosure. As shown in FIG. 8, smart collector 610 may collect all metrics initially at a default interval (e.g., a predetermined default sampling rate) from the metric exporters 604. For each metric, corresponding metric values with their associated metric name are stored in the metric TSDB 608. Alert rule evaluator service 614 evaluates alert rules using stored metrics and stores incidents/alerts in alert history database 622 along with storing query history in database 618.

Metric smart collector 610 is enabled to determine various metric attributes. For example, metric smart collector 610 may read, for a given metric and associated alert rule, its query history, determine a corresponding metric access ratio using calculator 644 and store the access ratio in metric metadata database 638. The smart collector 610 may read a metric incident history, determine a metric threshold hit rate and store the threshold hit rate. The metric groups discovery service 636 may discover one or more related metrics that are related to a given metric, where these related metrics define a group, evaluate the related metrics and associated rules in the group, and determine a group access ratio based on the evaluation of rules associated with the related metrics in the group. Other different metric attributes may also be determined to be relevant to a desired sampling rate of a given metric, or a group of metrics. Using the determined metric attributes, the smart collector is enabled to determine a predicted metric weight for the given metric and associated alert rule using metric weight predictor 640. Using the predicted metric weight, an updated collection sampling rate may be determined and subsequently used by metric sampler 630 to collect additional metrics. In this manner, a given metric may be collected using a custom sampling rate for the given metric or a related group of metrics.

In examples, a metric weight may be determined based on various considerations/metric attributes, such as expressed in the following guidelines:
a) If the user has accessed a metric (at some frequency) via a query, the user is likely to access the same metric again in the near future.
b) If the user has accessed a metric, the user may also be interested in related metrics as well. The related metrics may be identified based on various factors such as:
  1. If two metrics were accessed by the user in some time window frequently or simultaneously, those metrics may be considered to be related.
  2. If two metrics were accessed by the user when some system incident has occurred, those metrics may be considered to be related.
  3. If two metrics share common metric labels (e.g., CPU related metrics), those metrics may be considered to be related.
  4. If two metrics are exported by the same or a dependent software component or module, those metrics may be considered to be related.

Based on the above considerations, a set of metric relevance attributes, such as metric access ratio, metric threshold hit rate, related metric groups access ratio, and metric variance may be calculated for each metric and used to calculate the weight of a metric, as described below.
a) Metric Access Ratio: may be defined as the ratio between access rate and sampling rate and indicates that how many times a metric has been accessed to evaluate an alert rule when compared to its number of samplings for a given period of time. A higher value indicates that a user is more interested in the metric and a lower value indicates that a user is less interested in the metric. In other words, the access rate of a metric is the number of times a metric is accessed in some fixed time duration. The sampling rate of a metric is the number of times a metric is sampled in that fixed time duration. The metric access ratio may be determined by metric access ratio calculator 644.

Metric Access Ratio=access rate/sampling rate b) Metric Threshold Hit Rate may be defined as the number of times the value of a metric crosses a threshold value set by the user in a corresponding alert rule divided by the number of samples. Generally, a user sets the threshold value in alert rules for useful metrics to monitor the behavior of the system. The metric threshold hit ratio may be determined by smart collector 610 using results of alert rule evaluator service 614.

metric threshold hit rate=number of times metric crossed threshold value/number of samples c) Access Ratio of Group of related metrics: may be defined as an average access ratio of each metric of a group of metrics which are related to the metric. The related metrics may be identified using metric labels, origin, and query history. When two metrics contain common labels or originated from the same exporter/software component or are queried together, those two metrics may be considered as related metrics. A group access ratio may be calculated using an average of access ratios of the individual metrics of the group. This metric attribute may be determined by metric groups discovery service 636 and metric access ratio calculator 644.

Access Ratio of Group of related metrics=average (Access Ratio of all metrics of group)

If there are more groups that are related, then a Related Metric Groups Access Rate can be determined, where Related Metric Groups Access Rate=average (Access Ratio of all groups)
d) Critical Metric Label: A metric may be automatically flagged as critical when it is part of a critical event. A critical metric label tag may be attached to these kinds of metrics and when so attached, a maximum weight may be assigned to the metric, which results in that metric being sampled more frequently. Some examples of metrics to which this could apply may include: packet drops, CRC error count, etc. In some cases, where a metric is manually labelled as a critical metric or system metric, a lowest threshold interval value is automatically considered (i.e., a predetermined high sampling rate). This may be determined by critical metrics discovery service 642.
e) Metric Variance: may be defined as the difference between two metric values sampled in a certain time window. Metric variance indicates how the metric value is changing over a period of time. Metrics with lower variance may be considered lower weight and would be sampled at higher intervals. Metric variance may be determined by metric variance detector 634.

By using relevance attributes of a metric, its weight may be predicted, using metric weight predictor 640 and machine learning model of machine learning module 621. Machine learning module 621 can be used to read historical data related to a metric, such as historical relevant attributes of a metric, and train a metric weight machine learning model. A smart collector training process includes determining relevant attributes of a metric, feeding the relevant attributes to the machine learning model, predicting a metric weight, and determining an updated sampling interval (corresponding to a collection frequency).

Specifically, a metric weight may be calculated using linear regression using metric attributes R1, R2, R3, R4, as follows:

Metric Access Ratio as R1
Metric Threshold Hit Ratio as R2
Related Metric Groups Access Rate as R3
Metric Variance as R4

$$W1 = a + b(R1)$$

$$W2 = a + b(R2)$$

$$W3 = a + b(R3)$$

$$W4 = a + b(R4)$$

where $a = (\Sigma Wi)(\Sigma Ri*2) - (\Sigma Ri)(\Sigma WiRi)/n(\Sigma Ri*2) - (\Sigma Ri)2$
$b = n(\Sigma WiRi) - (\Sigma Ri)(\Sigma Wi)/n(\Sigma Ri*2) - (\Sigma Ri*)2$ A weight of a metric may be computed by taking a mean of the predicted weights.

$$WR = \left(\sum_{i=1}^{n} W_i\right)/n$$

where n is the number of samples. Using the computed metric weight (or a determination that a metric is critical), an updated sampling interval/sampling rate can be determined. Subsequently, smart collector 610 may use the new sampling interval for obtaining metric values for that metric.

Figure 7:
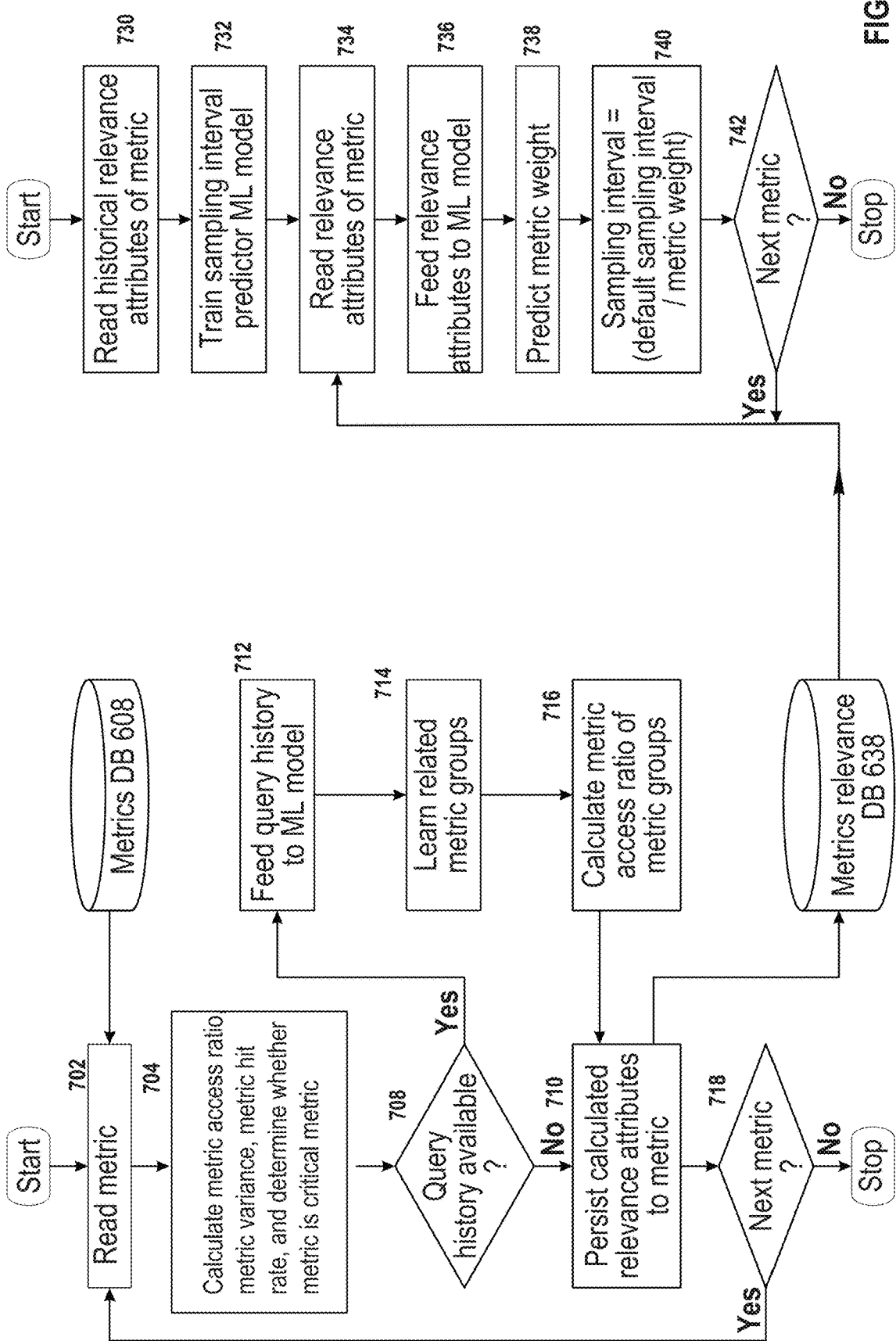
FIG. 7 is an example flow chart for determining a metric weight and a corresponding new sampling interval for collection of a metric, according to techniques described in this disclosure.

FIG. 7 is an example flow chart for smart collector 610 of performance monitoring system 600 for determining a metric weight and a corresponding updated sampling interval for collection of a metric, according to techniques described in this disclosure. At 702, smart collector 610 reads a metric from metric database 708. At 704, the smart collector may determine one or more of the following: metric access ratio, metric variance, whether the metric is a critical metric, and a metric threshold hit rate. At 708, a determination is made as to whether a query history for other metrics is available. If so, processing proceeds to 712. If not, processing proceeds to 710.

At 712, the query history is fed to a machine learning model, wherein one or more related metrics groups may be determined at 714 using metric groups discovery service 636. Smart collector at 716 may calculate metric access ratios of metric one or more groups using metric access ratio calculator 644. At 710, relevance attributes as calculated at 704 or 716 are persisted, and at 720 this metric relevance data may be stored, such as in database 638, and processing proceeds to 718. At 718, a determination is made whether another next metric is to be evaluated. If not, processing ends. If another metric is to be evaluated, processing proceeds to 702 to repeat steps 702-718 for the next metric.

To predict a metric weight and calculate an updated sampling interval, machine learning module at 730 may read historical relevance attributes of metrics. At 732, a machine learning model for predicting a metric weight and collection sampling interval is trained using the historical relevance attributes. At 734, relevance attributes of a particular metric are read, and at 736, these are passed to the machine learning model. At 738, a metric weight is predicted and at 740, a sampling interval is calculated such as by dividing the default sampling interval by the predicted metric weight or using a predetermined minimum collection sampling interval (maximum frequency) for collection if the metric is a critical metric. At 742, additional metrics are evaluated using steps 734-740 and processing ends after all metrics are evaluated.

Example pseudocode for implementing the above techniques is included below:

```
struct metric {
    Metric_Name string,
    // A learnt number indicating how much this metric relevant to user
    Relevance_Score number,
    // Values captured at different time periods. Time series values.
    Metric_Value_List list,
    // How often this metric should be sampled by collector
    Sample_Interval time,
    // Number of times this metric accessed by user
    Access_Count number,
    // Number of times this metric is sampled by collector
    Sample_Count number,
    // Number of times user accessed this metric in a fixed time
    Access_Rate number,
    // Number of times metric sample collected in a fixed time
    Sample_Rate number,
    // Number of metric accesses vs Number of metric samplings
    Access_Ratio number,
    // Number of times metric value crossed user defined threshold limit
    Metric_Value_Threshold_Hit_Rate number
    // Set of metric groups this metric belongs
    Metric_Groups list
    // Number of times the metric accessed together with other metrics
    Metric_Group_Access_Rate
```

```
}
func FindMetricRelevanceAttributes( ) {
set metrics = read metrics from database
for each metric in metrics
do
   set Access_Rate = ( metric.Access_Count / Time_Duration )
   set Sample_Rate = ( metric.Sample_Count / Time_Duration )
   set Access_Ratio = ( metric_access_rate / metric_sample_rate )
   set Threshold_Hit_Rate = FindMetricThresholdHitRatio( metric )
   set Metric_Groups = LearnRelatedMetrics( metric )
   set Metric_Group_Access_Rate = FindGroupAccessRate( Metric_Groups )
end
}
func LearnMetricSamplingInterval(metric, default_sample_interval) {
   set metric_sampling_interval = 0
   set metric_relevance_score = 0
   feed Metric_Access_Ratio, Metric_Threshold_Hit_Rate,
   Metric_Group_Access_Rate to ML model
   relevance_score = Relevance_score_Prediction_MLModel(Access_Ratio,
   Threshold_Hit_Rate, Group_Access_Rate)
   metric_sampling_interval = relevance_score * default_sample_interval
   return metric_sampling_interval
}
func LearnRelatedMetrics(metric) {
   set related_metric_group = { }
   read query history of metrics
   feed query history to ML classification model
   set related_metric_group = MetricGroupingMLModel(query_history)
}
func FindGroupAccessRate(metric_groups) {
   set average_group_access_rate = 0
   set total_group_access_rate = 0
   for each group in metric_groups
   do
      set group_access_count = sum(access count of each metric in group)
      set group_sample_count = sum(sampling count of each metric in group)
      set group_access_rate = (group_access_count / group_sample_count)
      set total_group_access_rate = total_group_access_rate +
      group_access_rate
   end
   set average_group_access_rate = (total_group_access_rate / number of
   metric_groups)
   return average_group_access_rate
}
func FindMetricThresholdHitRatio(metric_sample_count, threshold_value) {
   set threshold_hit_count = 0
   for each value in metric.Metric_Value_List
do
   if value > threshold_value do
   set threshold_hit_count = threshold_hit_count + 1
   end
   end
   set threshold_hit_ratio = (threshold_hit_count / metric_sample_count)
   return threshold_hit_ratio
}
```

Machine Learning System for Telemetry Rule Evaluation

As previously described, a background service called the alert rule evaluator service periodically evaluates alert rules. Some performance monitoring systems use static time intervals for evaluating alert rules. When the alert rule evaluator service generates an alert for the user because a comparison condition is true, a rule evaluation is considered to be a rule hit and otherwise, if no alert is generated, it is considered to be a rule miss. The periodic rule evaluation process involves compute intensive tasks like querying of a huge amount of telemetry data, aggregating the telemetry data, and comparing aggregated data against multiple threshold values.

A rule evaluation process using static time intervals may fail to appropriately evaluate rules when a large number of rules are configured in a computational resource-constrained environment. Also, computational resources may be wasted while processing rules in a heavily loaded system. To get around these scaling issues, administrators usually limit the number of rules they configure or increase the rule evaluation interval.

An optimized rule evaluation period means that rules can be evaluated at different frequencies based on their past evaluation success or failure (hit or miss) rate. This means, when a rule is not hit for a long period of time, solutions based on a fixed evaluation rate will waste resources as the probability of a successful evaluation in the near future is low.

In examples, a performance monitoring system with machine learning based intelligent methods is used for rule evaluation. With this method, the rules are evaluated periodically at optimized rule evaluation time intervals, which may vary over time as network conditions change. An evaluation time interval for a rule may be assigned based on a determined weight of a rule. A determined weight of a rule may indicate a priority of the rule, and may be inversely proportional to a desired evaluation interval of the rule. In other words, when the weight of the rule is higher, the corresponding evaluation interval is less and vice-versa. The weight of rule may be predicted using a machine learning model and past rule evaluation data.

FIG. 9 illustrates an example performance monitoring system 900 which leverages machine learning via machine learning module 921 to determine improved evaluation intervals for evaluating alert rules in accordance with techniques described herein. Performance monitoring system includes metric collector 910, metric TSDB 908, metric querier 912, and alert rule evaluator service 914. As shown in FIG. 9, alert rule evaluator service includes alert rules database 920, alert rule evaluator 924, incident reporter 916, rule evaluation history database 928, alert rule history analyzer 926, and rule weight predictor 922. Alert rule evaluator service 914 may operate in manner similar to operation of alert rule evaluator service 514, 614 as described herein and may include additional capabilities using machine learning. Service 914 may store rule evaluation results in rule evaluation history DB 928, which may be a persistent database, and machine learning module 921 may use these results to derive analytics regarding alert rule evaluation, such as by predicting rule weight. As previously described, when evaluation of an alert rule generates an alert (by comparing a metric value to a threshold value of a rule and determining that the rule comparison condition is true), an evaluation result is considered as a rule hit. When an alert is not generated, meaning the comparison condition is not true, this is considered a rule miss. By analyzing a rule and its corresponding metric over time, such as by determining hits and misses of a series of collected metric values at a first rule evaluation interval and predicting a rule weight, an updated evaluation interval may be determined based on the predicted rule weight.

In particular, machine learning module 921 may interact with or be incorporated in alert rule evaluator service 914. Alert rule history analyzer 926 may analyze the rule evaluation history and derive rule analytics, such as described below. Alert rule history analyzer 926 may provide (or in other words, pass, potentially as a reference to a memory location storing such analytics—e.g., a pointer) the analytics to rule weight predictor 922, which may process the analytics to determine a rule weight and hence a corresponding updated evaluation interval for rule evaluation. For example, the following rule analytics may be used:

a) Rule Hit Rate (RHR) may be defined as the number of successful evaluations (alerts/hits) out of the total evaluations of the rule.

RHR=alerts generated by a rule/total number of evaluations of a rule b) Related Rules Hit Rate (RRHR) may be defined as the average success rate of other alert rules related to a given rule rule. For example, if two rules contain metrics that originate from the same source in the network, those two rules may be considered as related rules. This metric provides a general health of the system. A higher RRHR value indicates that system health is not good and a probability of rules generating alerts is high. It may be calculated as follows:

RRHR=total hit rate of all related rules/total number of evaluations of related rules.

c) Rule Close Missed Rate (RCMR) may be defined as the number of evaluations that failed to generate alerts due to an evaluated metric value that is less than but close to the threshold value of a rule by a small margin. In other words, the rule is evaluated to a value which is just fractionally short of a rule's threshold value. A missed margin may be calculated as a percentage against a threshold value of the rule.

Missed margin=100−[(evaluated value*100)/threshold value of the rule]

To mark an evaluation as a close miss, the missed margin value may be compared to an acceptable margin limit and an evaluation may be considered as a close missed evaluation when a margin is within the acceptable margin limit. For example, if the threshold value of a rule is 20 and an evaluated value of the rule is 18, then the missed margin=100−[(18*100)/20], which is 10%. This means that the rule evaluation failed to generate an alert due to a 10% amount. To consider the evaluation as a close miss, assume that 20% is used as the missed margin threshold. So with a 10% missed margin, the evaluation is considered a close missed evaluation. The rule close missed rate may be calculated as follows:

RCMR=number of close missed evaluations/total number of evaluations.

d) Rule Metric Criticality: Rule metrics may be considered critical such as when a flag gets attached to a rule when any of the metrics involved in the rule is part of a critical event and is flagged by a user, or when metric metadata at run time is labelled as critical. For example, when a user observes a log event for packet drops, that event may be labelled as critical and all network related metrics may also be considered critical metrics. When a metric is labelled as critical, the weights of rules involving that metric may be set to a maximum value, which may causes the rule evaluator to evaluate those rules at a high frequency (i.e., using a smaller evaluation interval).

Using the above calculated rule analytics, the rule weight predictor 922 may predict a weight for the rule. Depending on the weight of the rule, a new evaluation time interval may be derived for the rule using an inverse relationship.

The rule analytics may be calculated periodically over a predetermined time period resulting in a prediction of the rule weight, such as by using the following:

Rule Hit Rate as R1

$R1$=(Count of Alerts/Count of Evaluations)

Related Rule Hit Rate as R2

$R2$=(Related Rules Hit Rate/Related Rules Evaluation Count)

Rule Close Missed Rate as R3

$R3$=(Close Miss Evaluation Count/Evaluation Count)

A rule weight may be predicted using a linear regression formula and above calculated individual rates R1, R2, R3.

$W1=a+b(R1)$ $W2=a+b(R2)$ $W3=a+b(R3)$ where a=(ΣWi)(ΣRi*2)−(ΣRi)(ΣWiRi)/n(ΣRi*2)−(ΣRi)2
b=n(ΣWiRi)−(ΣRi)(ΣWi)/n(ΣRi*2)−(ΣRi*)2

The mean of the predicted weights may be considered as the weight of the rule.

$$WR = \left(\sum_{i=1}^{n} W_i\right)/n$$

The alert rule evaluator service 914 may then calculate a new evaluation interval for a rule based on the weight of the rule as follows:

Updated evaluation interval=(default or first rule evaluation interval/rule weight).

The alert rule evaluator service 914 may use the updated rule evaluation interval to subsequently evaluate a rule using newly collected metrics.

In examples, the alert rule evaluation interval is independent of the collection sampling rate. In some cases though, performance monitoring system may coordinate a metric collection sampling rate with the rule evaluation interval. If a rule is to be evaluated less often than previously, it may be desirable to at the same time slow down the collection of the related metric and if a rule is to be evaluated more often than previously, it may be desirable to increase the collection rate (decrease the collection sampling interval) of the related metric.

Figure 10:
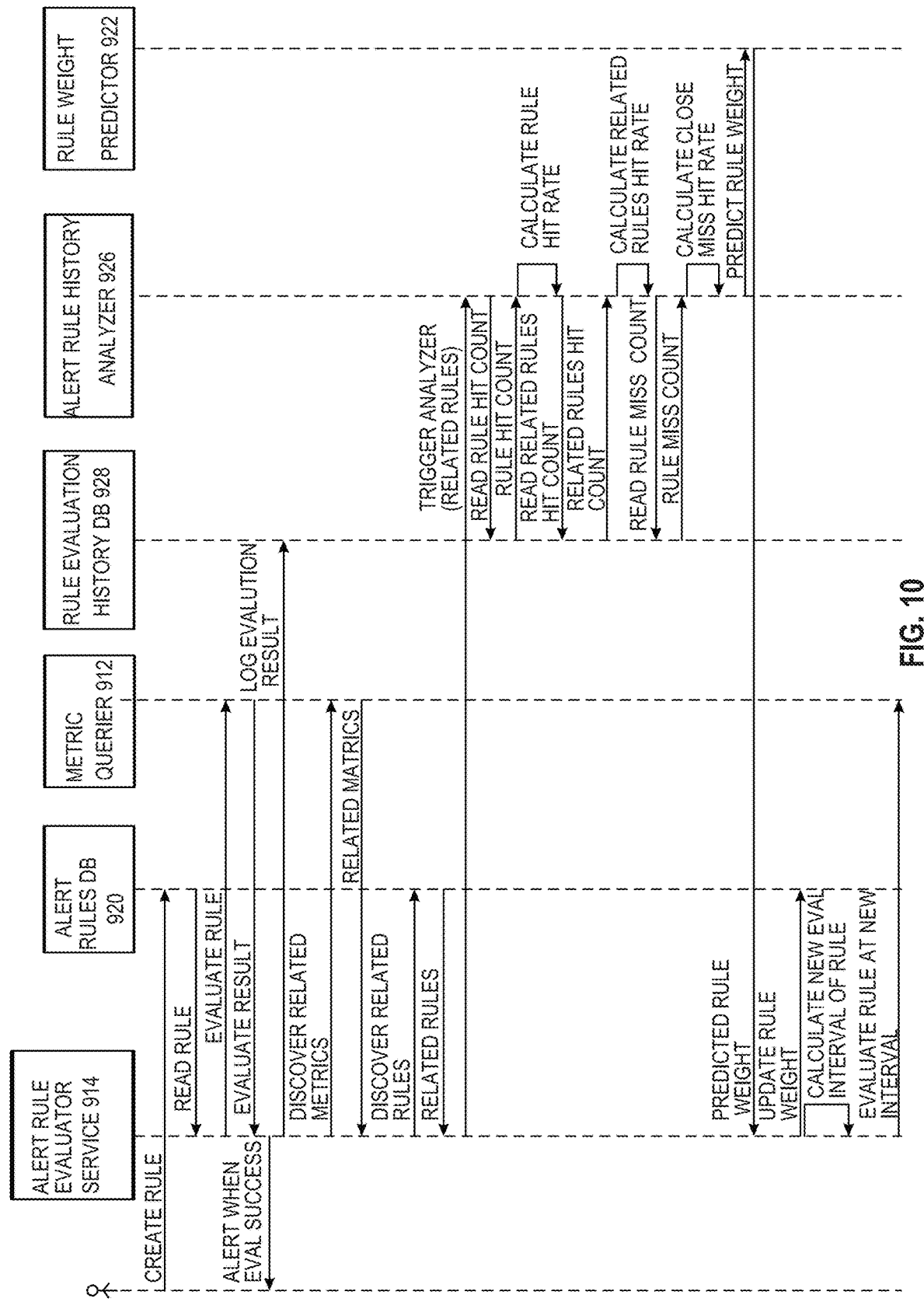
FIG. 10 is an example sequence diagram for the performance monitoring system of FIG. 9 that provides additional details on the interactions between various components, according to techniques described in this disclosure.

FIG. 10 illustrates an example sequence diagram for the performance monitoring system 900 of FIG. 9. Alert rules, such as those created by users, may be created and stored in alert rules database 920. Alert rule evaluator service 914 may read a rule from alert rules database 920, and may evaluate the rule by accessing metric querier 912 to receive corresponding metric values for the metric and performing a comparison of metric values with a corresponding threshold value of the rule to determine hit and miss counts for each rule using a first evaluation interval. The evaluation results may be stored in rule evaluation database 928. The alert rule evaluator service 914 may discover related metrics, and related rules for a given rule, and compute related rules hit and miss counts. The alert rule service may also calculate a rule hit rate, a related rules hit rate, and a close hit rate. These rule attributes and the rule history may be used in a machine learning model as training data for a rule weight predictor. The machine learning model may use rule attributes corresponding to the first evaluation interval to predict a rule weight, and determine an updated rule evaluation interval based on the predicted rule weight, and subsequently evaluate the rule using the updated evaluation interval.

Figure 11:
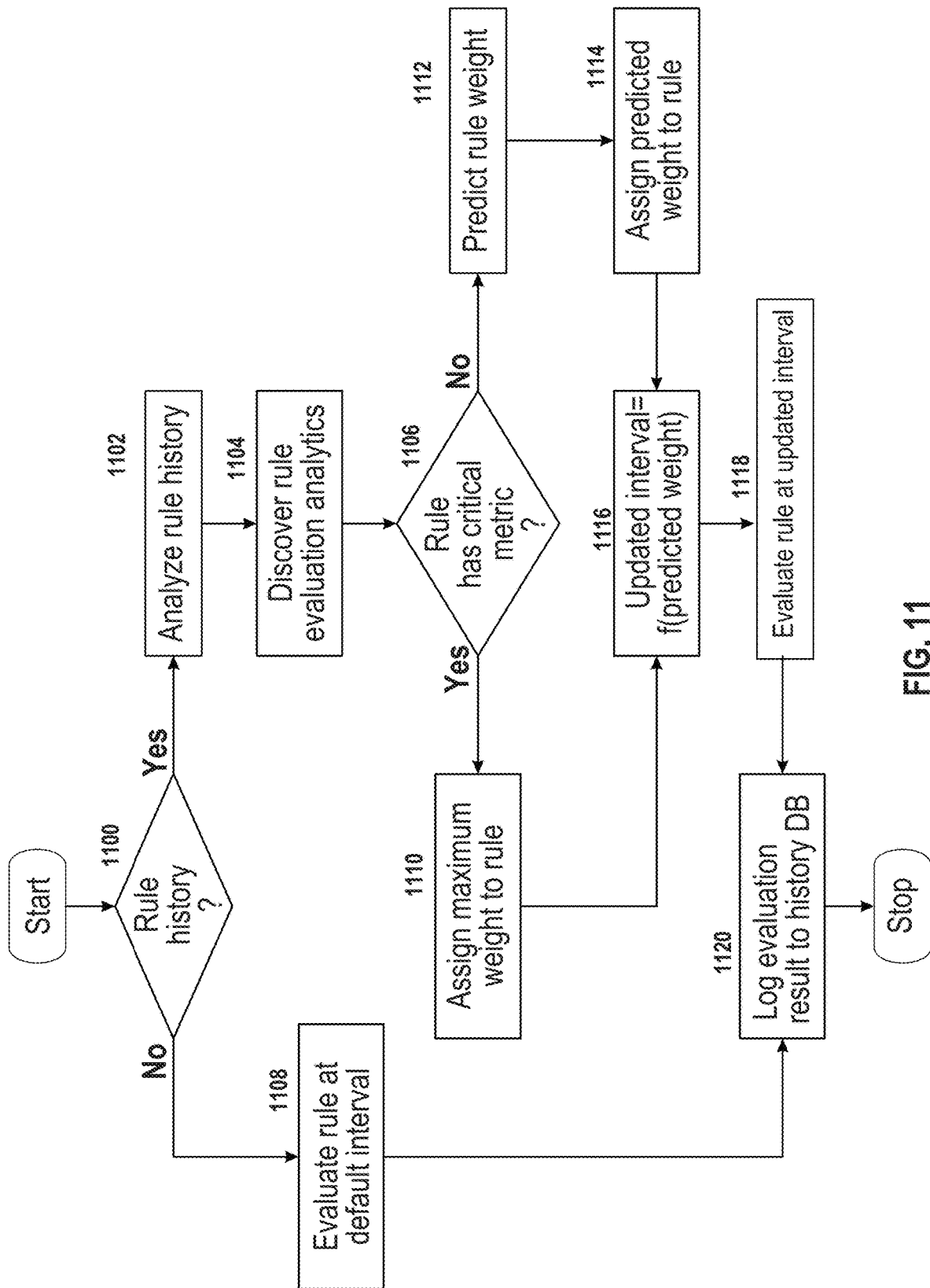
FIG. 11 is an example flowchart illustrating the actions of the alert rule evaluator service of FIG. 9, according to techniques described in this disclosure.

FIG. 11 is a flowchart illustrating actions of the alert rule evaluator service 1114 and according to techniques of this disclosure. Initially, at 1100 alert rule evaluator service 1114 may determine whether a rule history exists. If not, at 1108 a rule may be evaluated at a default first evaluation interval for each of a plurality of times, with the evaluation results being logged to the history database. If a rule history exists, at 1102 the rule history corresponding to the rule may be examined, and at 1104 rule evaluation analytics (rule attributes) may be determined and used as training data for updating a rule weight predictor of machine learning module 921. At 1106, a determination may be made whether or not the rule includes a critical metric. If the rule is determined to have a critical metric, then at 1108 a maximum weight may be assigned to the rule, and the updated evaluation interval may be determined as a function of the predicted weight at 1116. In examples, for a critical metric, a predetermined minimum evaluation interval may be used. If the rule is determined to not have a critical metric, then at 1112 a rule weight may be determined for the rule using the rule evaluation analytics/rule attributes, at 1114, the predicted weight is assigned to the rule, and at 1116, an updated evaluation interval may be determined as a function of the predicted weight. In examples, the updated evaluation interval is inversely proportional to the predicted weight of the rule. At 1118, the rule may then be evaluated using the updated evaluation interval, and at 1120, these new evaluation results may be stored in the rule evaluation history database 928. The actions illustrated in FIG. 11 may continue on an ongoing basis to continuously optimize a rule evaluation interval as conditions of the monitored network change.

Example pseudocode for implementing the above techniques is included below:

Pseudocode

```
function schedualeRuleEvaluation(rule) {
    Get weight of the rule assigned by ML model
    Calculate schedule interval for the rule
    schedule_interval = (default_evaluation_interval/rule_weight)
    schedule rule evaluation at (current time + schedule interval)
}
function learnAndAssignWeightOfRule(rule) {
    Get hit rate of rule by passing rule to
    function 'calculateRuleHitRate'
    rule_hit_rate = calculateRuleHitRate(rule)
    Get hit rate of related rules by passing rule to
    function 'calculateRelatedRulesHitRate'
    related_rules_hit_rate = calculateRelatedRulesHitRate(rule)
    Get close miss rate of rule by passing rule to
    function 'calculateRuleMissRate'
    close_miss_hit_rate = calculateRuleMissRate(rule)
    Identify machine learning target function/model using above factors as
    input or training data.
        rule_weight_predict_ml_function = fn(rule_hit_rate,
    related_rules_hit_rate, close_miss_hit_rate, rule_resolution_rate)
        Predict weight of the rule using machine learning model function
        Assign predicted weight to rule
```

Pseudocode

```
}
function findRelatedRulesOfRule(input_rule) {
    // Discover rules which are related to the passed rule
    // If two rules share a telemetry data metric which
    // is originated from same source, those two rules
    // considered as related
    Initialize related rules to empty array
    related_rules = [ ]
    for each rule R in rules
        for each metric M in input_rule's metric
            if R's metric list contains M AND Metric source is same
                Add rule R to related_rules
    return related_rules
}
function calculateRelatedRulesHitRate(rule) {
    Discover related rules of the rule by passing rule
    to function 'findRelatedRulesOfRule'
    related_rules = findRelatedRulesOfRule(rule)
    Calculate average of hit rates of related rules
    total_hit_rate = 0
    for each rule in related_rules {
        Get hit rate of rule by passing rule
        to 'calculateRuleHitRate' function
        total_hit_rate = total_hit_rate + rule's hit rate
    }
    return total_hit_rate/count of related rules
}
function calculateRuleHitRate(rule) {
    // How many rule evaluations result in alert generation
    hit_rate = (generated_alerts) / (total_evaluations_count)
    return hit_rate
}
function calculateRuleMissRate(rule) {
    // how many times rule missed to generate alerts
    // by margin of some value. Say, 10%
    Calculate miss margins of previous evaluations of rule
    by passing to rule and miss margin threshold to
    function 'countCloseMissEvaluations'
    total_close_miss_margins_count = countCloseMissEvaluations(rule, threshold)
    miss_rate = total_close_miss_margins_count / total_evaluations_count
}
function countCloseMissEvaluations(rule, miss_margin_threshold) {
    // How many previous evaluations missed generating alert by small
    // margin
    Initialize count of close miss evaluations to zero
    count_close_miss_evaluations = 0
    for each previous rule evaluation calculate miss margin
        miss_margin = ((evaluated_value / rule_threshold_value) * 100) - 100
        if miss_margin is less than miss_margin_threshold
            Increment close miss evaluations counter
            count_close_miss_evaluations = count_close_miss_evaluations + 1
    return count_close_miss_evaluations
}
```

Self-Learning Telemetry Alert Rule Recommender

FIG. 12 illustrates an example of a performance monitoring system 1200 in accordance with techniques of this disclosure, which provides recommended alert rules for performance monitoring a network of computing devices. Performance monitoring system 1200 may be similar in many respects to monitoring systems 500, 600, 900 described herein and may also include various other components of those systems. As shown in FIG. 12, system 1200 may include metric collector 1210, metric TSDB 1208, metric querier 1212, alert rule evaluator service 1214, and machine learning module 1222. Alert rule evaluator service 1214 may include an alert rules database 1220, alert rule evaluator 1218, and incident reporter 1216. The alert rule evaluator service 1214 may store rule evaluation results in a persistent database and the machine learning module 1222 may use this data to derive analytics about user created alert rules as well as provisional relevant rules in order to automatically generate recommended alert rules in order to fine tune the information generated by alerts to be more relevant to a user.

For example, if a network system CPU usage is high, typically an administrator will look for an application or module in the system which has consumed the most CPU resources or performed the most CPU intensive operations. After such an analysis, the administrator usually creates one or more additional alert rules with relevant metrics to catch the high CPU issue before it happens again and perhaps take action to prevent the system CPU from becoming too high.

This manual creation of alert rules may be time consuming and may require the administrator to analyze the metric data, and try to identify suspicious metrics which may be related to the issue the administrator is trying to diagnose. It may become more difficult when the quantity of telemetry data is high. The manual process of creating an appropriate set of alert rules to diagnose a problem may be time-consuming, inefficient, and in some cases, unsuccessful due to a time delay for implementing the manually user-created alert rules. For example, by the time an administrator starts the investigation or the new rules are added, the fault/issue may no longer exist.

A machine learning based intelligent alert rule creation method according to techniques of the disclosure may automatically discover relevant metrics related to metrics of existing rules and recommend additional alert rules for future problem analysis. The recommended alert rules may be automatically implemented or may require user approval for implementation and provide a way to ease the burden of manual rule creation, while conserving network resources by providing alert rules that are relevant and provide meaningful information regarding the network.

Alert rules, such as those created by users, are stored in alert rules database 1220. To evaluate an alert rule, alert rule evaluator service 1214 reads an alert rule and its associated metric name, accesses the metric querier 1212 to receive corresponding metric values from metric time series database 1208 for the metric name in the rule, performs comparisons of metric values with a corresponding threshold value of the rule, and may provide alerts when rule hits occur via incident reporter 1216, and may log evaluation results, including hits and misses, in a rule evaluation history database (not specifically shown in FIG. 12).

Figure 13:
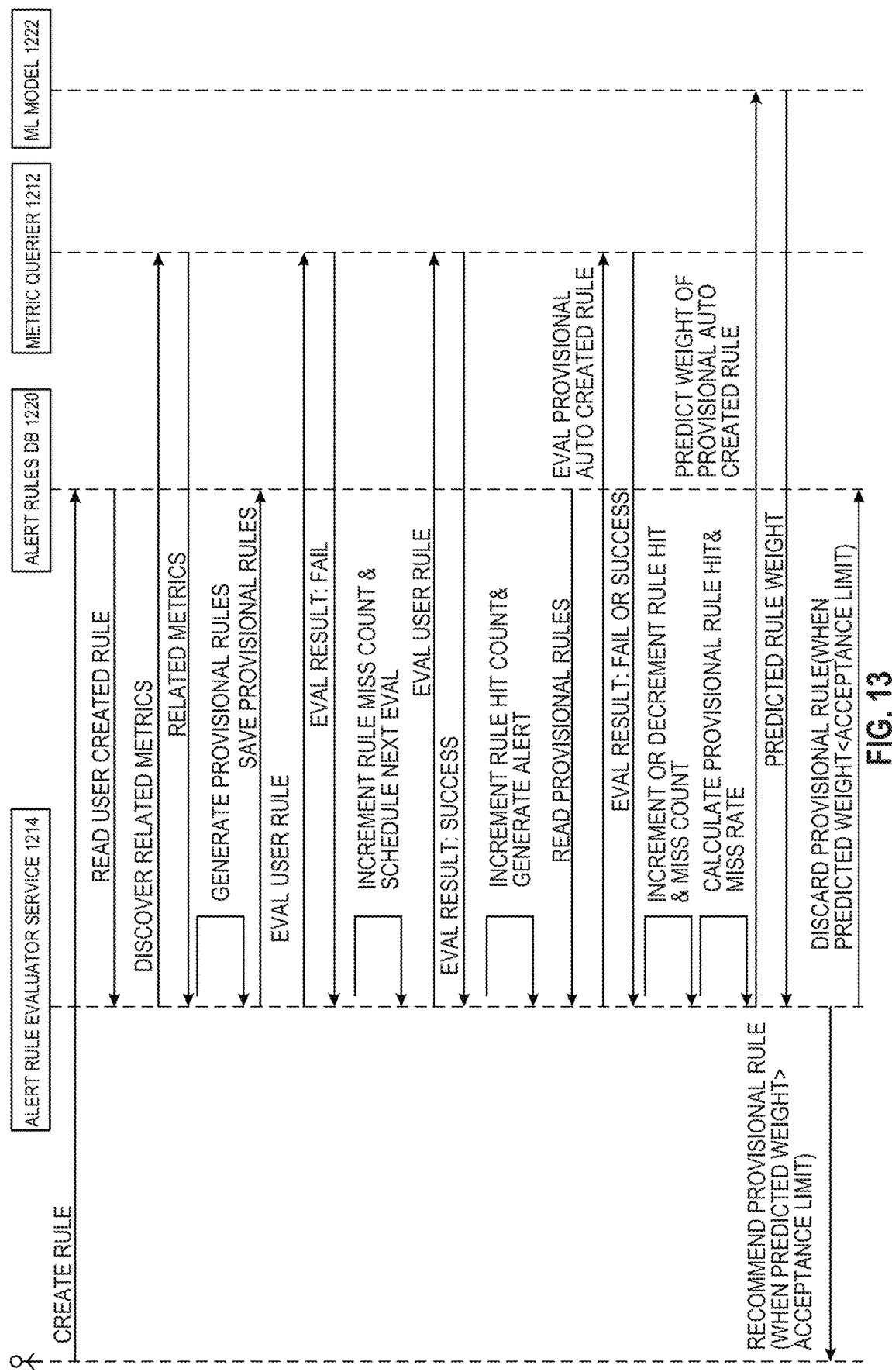
FIG. 13 is an example sequence diagram for the performance monitoring system of FIG. 12 that provides additional details on the interactions between various components, according to techniques described in this disclosure.

FIG. 13 illustrates an example sequence diagram for the performance monitoring system 1200 of FIG. 12. Alert rule evaluator service 1214 may read a user-created alert rule and its associated metric name. The alert rule evaluator service discovers a set of related metrics that are related to the metric of the user-created alert rule, and creates provisional relevant rules using the discovered related metrics, as described in more detail below and automatically generate provisional rules based on the analysis. The provisional relevant rules may be saved, such as in alert rules database 1220. The user created alerts rules are evaluated using corresponding metrics from the metric time series database 1208. If a rule miss occurs, a miss count is incremented and if a rule hit occurs, a rule hit count is incremented and an alert may be generated. An evaluation count (total number of evaluations) of the user created alert rules may also be tracked. The auto-generated provisional relevant rules may also be evaluated using corresponding metrics from the metric time series database 1208. For each provisional relevant rule, a corresponding rule attribute may be determined, such as one or both of a provisional hit rate and a provisional miss rate, as well as other possible rule relevancy attributes such as a relative, as described below. Machine learning module 1222 may predict a weight of each auto-generated provisional rule. A provisional rule may be recommended to the user when the predicted weight of the provisional rule is greater than (or greater than or equal to) a predetermined acceptable value, and may be discarded, and not provided as a recommended rule to the user, when the predicted weight is less than (or less than or equal to) the acceptable value.

Figure 14:
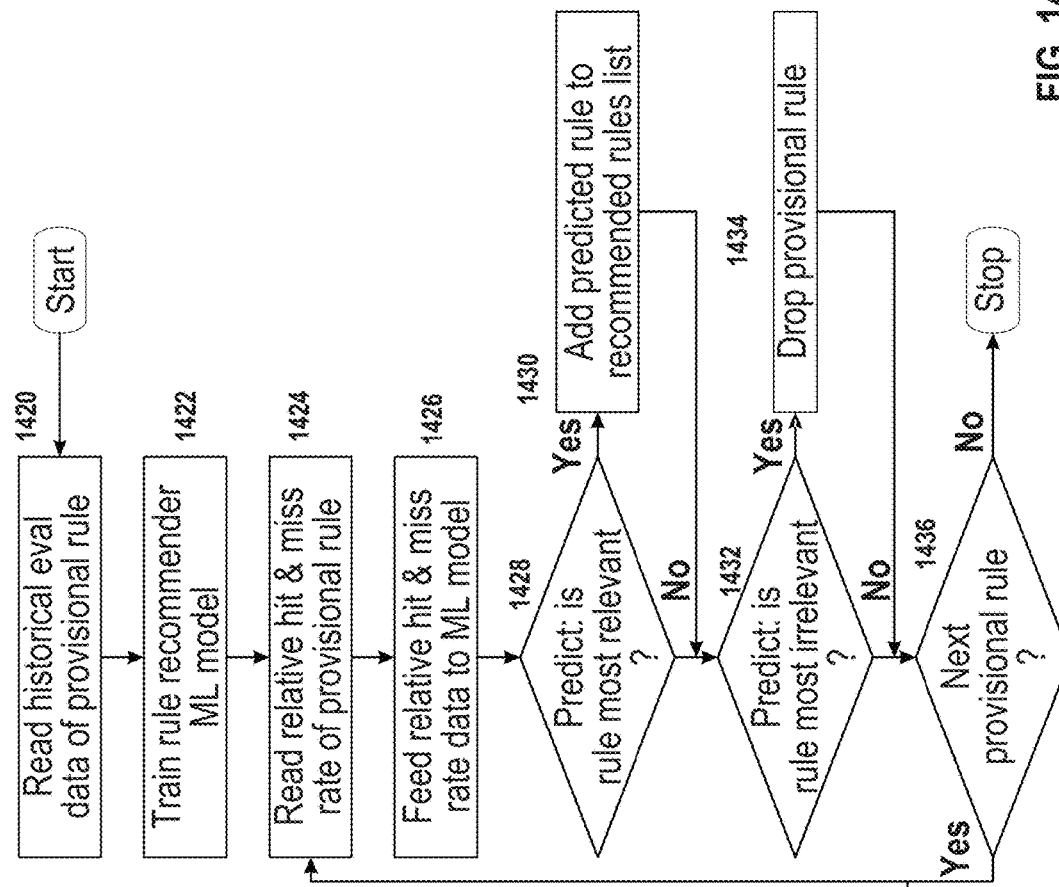
FIG. 14 is an example flowchart illustrating example actions of the performance monitoring system of FIG. 12, according to techniques described in this disclosure.
Figure 14:
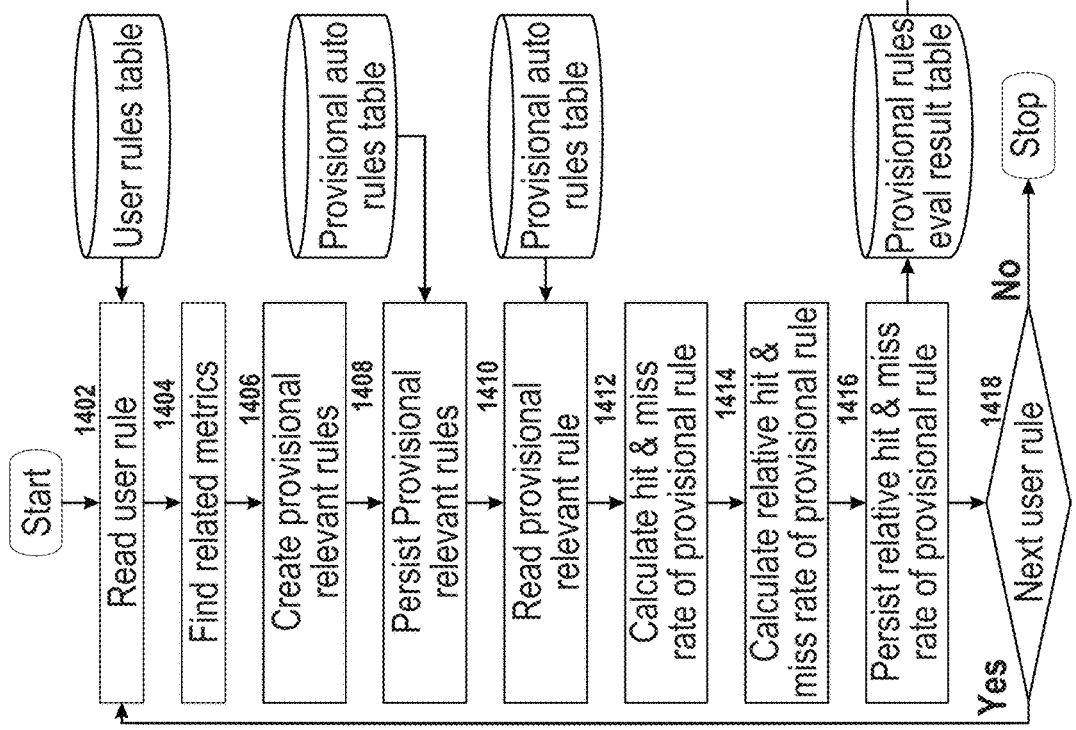

FIG. 14 is a flowchart illustrating example operation by alert rule evaluator service and machine learning module of the performance monitoring system of FIG. 12 to create and evaluate provisional rules, according to techniques of this disclosure. At 1402, alert rule evaluator service 1214 may read a user-created alert rule from a user rules table, which may be alert rules database 1220. At 1404, alert rule evaluator service 1214 finds related metrics at 1404, and creates one or more provisional relevant rules at 1406. At 1408, the provisional relevant rules may be persisted, such as in a provisional auto rules table, which may be alert rules database 1220. At 1410, for each created provisional rule, the provisional rule may be read and evaluated to determine hits, misses, and evaluation counts, and at 1412, hit and miss rates for the provisional rule may be calculated. At 1414, relative hit and miss rates of the provisional rule may be calculated. This information is persisted at 1416, such as in a provisional rules evaluation result table. Each of the provisional rules associated with a user created rule may be evaluated according to steps 1410-1416. At 1418, if there are additional user-created rules, each of these rules may have one or more provisional relevant rules determined that are then evaluated in the same manner as described above.

Machine learning module 1212 may be trained for predicting an alert rule weight for a provisional rule to determine the most relevant provisional rules. For example, as shown in FIG. 14, at 1420, machine learning module may read the historical evaluation data of each provisional rule, and at 1422, a rule recommender machine learning model may be trained. At 1424, the relative hit and miss rate of a provisional rule may be read from storage and at 1426 the relative hit and miss rate of the provisional rule may fed to the machine learning module, which may analyze the data using one or more of the rule relevancy attributes described below to determine a predicted weight for each corresponding provisional alert rule. At 1428, a prediction may be made as to whether the rule is most relevant. If so, then the rule is added to a recommended rules list. A prediction may also made as to whether the rule is most irrelevant. If so, then the rule is dropped and not recommended. Sets of provisional rules associated with other user created alert rules may be evaluated in the same manner.

When a user creates an alert rule, a set of related provisional alert rules may be created automatically, and these rules may be evaluated at multiples of a time interval for which the associated user created rule is evaluated. For example, when an evaluation interval of a user created rule is 30 seconds, evaluation intervals of related provisional rules may be 30*T seconds, where T may be a predetermined value, a random variable, an exponential variable, or the like.

When an alert rule created by the user is evaluated and a hit occurs, a machine learning model identifies the most relevant rule among the provisional rules and converts that provisional rule into a regular rule for future failure analysis.

A set of metrics may be identified as related metrics for each metric in a user created rule, such as when a related metric originates from a same service or component or module as the metric in the user created rule, and/or shares common metric labels. Labels may be used as keywords, and may act as indicators of different types of metrics. The related metrics that are determined may be translated into provisional rule sets using a set of metric aggregation and comparison operators.

For example, if a user has created an alert rule to monitor when an average aggregate value of metric 'system_cpu_usage' is greater than 80%, then the metric of the alert rule may be originated from a system resource monitor agent running on a machine and may be tagged with the label "cpu". There may be several other processes running on the same machine and these processes export their metrics for cpu usage and cpu intensive operations like encryption/decryption counts and the like as well. These other metrics are usually tagged with labels like 'cpu', 'cpu_intense_op', etc.

Assume some of the metrics exported by these processes are as shown below.
1. Metric #1: Metric-Name: app_x_cpu_usage Metric-Labels: label1=cpu
2. Metric #2: Metric-Name: app_x_encrypt_op_count, Metric-Labels: label2=cpu_intense_op
3. Metric #3: Metric-Name: app_y_net_if_down_count, Metric-Labels: label1=net err
4. Metric #4: Metric-Name: app_y_cpu_usage Metric-Labels: label1=cpu The related metrics identification process identifies Metric 1, 2 and 4 as related metrics because these metrics either originate from the same machine or they have common labels. After that, a set of provisional rules may be created for a user rule for different combinations of aggregation and comparison functions. The threshold values for provisional alert rules may be computed based on instrumentation metadata about the metric. For example, an instrumentation metadata for metric 'app_x_encrypt_op_count' would be how much approximate percentage of cpu each operation would consume.

In the above example, provisional rules may be created as shown below.
Provisional Rule-1: Average of 'app_x_cpu_usage' is greater than 80%
Provisional Rule-2: Average of 'app_x_cpu_usage' is less than 40%
Provisional Rule-3: Value of 'app_x_encrypt_op_count' is greater than 500
Provisional Rule-4: Value of 'app_x_encrypt_op_count' is less than 100
Provisional Rule-5: Average of 'app_y_cpu_usage' is greater than 80%
Provisional Rule-6: Average of 'app_y_cpu_usage' is less than 40%

The newly created provisional rules may be evaluated when the associated user created rule gets hit. After every evaluation of a provisional rule, a set of evaluation attributes may be calculated and assigned to each provisional rule. These evaluation attributes may indicate the effectiveness of the rule in generating alerts. The evaluation attributes are calculated as shown below.

Provisional Rule Hit Rate (PRHR): This indicates how often the provisional rule fulfills the rule condition (rule hit). It may be calculated as follows:

$$PRHR = \text{hit count/number of provisional rule evaluations}$$

Provisional Rule Miss Rate (PRMR): This indicates how often the rule fails to fulfill the rule condition (rule miss). It may be calculated as follows.

$$PRMR = \text{miss count/number of provisional rule evaluations}$$

This attribute may play a key role in learning which provisional rules are most irrelevant and discarding that irrelevant rules in future evaluations.

Relative Provisional Rule Hit Rate (RPRHR): This indicates how often the provisional rule fulfills its rule condition relative to an associated user created rule. It is calculated as follows:

$$RPRHR = \text{provisional rule hit rate/user created rule hit rate}$$

Relative Provisional Rule Miss Rate (RPRMR): This indicates how often a provisional rule fails to fulfill its condition relative to associated user created rule. It is calculated as follows:

$$RPRMR = \text{provisional rule miss rate/user rule miss rate}$$

This attribute plays a key role in learning the most irrelevant provisional rules and discarding those rules in future evaluations.

The above evaluation attributes may be used to predict the weight of each provisional rule. The predicted weight indicates the relevance of the provisional rule to a user created rule. A higher weight indicates that rule is more relevant and vice-versa.

The weight of the rule may be predicted using a simple linear regression machine learning model. For example, the weight is predicted against each relevant attribute and a mean of weights is considered as the weight of the rule.

Assume:
Provisional Rule Hit Rate as R1

$$R1 = (\text{Amount of Hits/Number of Rule Evaluations})$$

Provisional Rule Miss Rate as R2

$$R2 = (\text{Amount of Misses/Number of Rule Evaluations})$$

Relative Provisional Rule Hit Rate as R3

$$R3 = (\text{Provisional Rule Hit Rate/User Rule Hit Rate})$$

Relative Provisional Rule Miss Rate as R4

$$R4 = (\text{Provisional Rule Miss Rate/User Rule Hit Rate})$$

Predict rule weight using linear regression formula and above calculated individual rates.

$$W1 = a + b(R1)$$

$$W2 = a + b(1/R2)$$

$$W3 = a + b(R3)$$

$$W4 = a + b(1/R4)$$

where $a = (\Sigma Wi)(\Sigma Ri^*2) - (\Sigma Ri)(\Sigma WiRi)/n(\Sigma Ri^*2) - (\Sigma Ri)2$
$b = n(\Sigma WiRi) - (\Sigma Ri)(\Sigma Wi)/n(\Sigma Ri^*2) - (\Sigma Ri^*)2$ A mean of predicted weights can be used as a weight of the rule and compared to predetermined thresholds to determine whether a proposed rule is relevant or irrelevant.

$$WR = \left(\sum_{i=1}^{n} W_i\right)/n$$

Example pseudocode for implementing the above techniques is included below:

| Pseudocode |
| --- |
| function CreateRelatedProvisionalRules( ) {<br>  Read User Created Rule<br>  user_rule = readUserRule( )<br>  Find related Metrics of user rule<br>  related_metrics = FindRelatedMetrics(user_rule)<br>  Create provisional related rules using related metrics<br>  provisional_rules = CreateProvisionRules(related_metrics)<br>  Save Provisional rules<br>}<br>function EvaluateUserRule(user_rule) {<br>  Execute rule condition and assign result to 'rule_eval_result' |

```
Pseudocode

Increment rule evaluation count
  if rule_eval_result is true
    Increment hit count of rule
    Calculate user rule hit rate
    user_hit_rate = (rule_hit_count / rule_eval_count)
    Update hit rate of user rule
  else
    Increment miss count of rule
    Calculate miss rate of rule
    user_rule_miss_rate = (rule_miss_count / rule_eval_count)
  Read provisional rules of user rule from storage into provisional_rules
array.
    Evaluate each provisional rule
    for each rule in provisional_rules
      Execute rule condition and assign result to
'provisional_rule_eval_result'
      Increment rule evaluation count
      if provisional_rule_eval_result is true
        Increment hit count of provisional rule
        Calculate rule hit rate
        provisional_rule_hit_rate = (provisional_rule_hit_count /
provisional_rule_eval_count)
        Calculate Relative hit rate of provisional rule
        relative_hit_rate = (provisional_rule_hit_rate /
user_rule_hit_rate)
        Update Provisional Rule hit rate and Relative Rule hit rate
      else
        Increment miss count of provisional rule
        Calculate rule miss rate
        provisional_rule_hit_rate = (provisional_rule_hit_count /
provisional_rule_eval_count)
        Calculate Relative hit rate of provisional rule
        relative_hit_rate = (provisional_rule_hit_rate /
user_rule_hit_rate)
        Update Provisional Rule hit rate and Relative Rule hit rate
}
function FindRelatedMetrics(user_rule) {
  Initialize array of related metrics with empty
  for each user rule metric
    Search for metric matching source and labels in all metrics list
    Add searched metric with related metrics array
  return array of related metrics
}
function CreateProvisionRules(related_metrics) {
  Create rule conditions using combinations
  different aggregation functions and comparison operators
  return array of provisional rules
}
function LearnAndRecommendRule( ) {
  Read Provisional rules
  Iterate over Provisional rules
  for each rule in Provisional rules
    Feed Hit & Miss Rate of Provisional rule to ML model
    Feed Relative Hit and Miss Rate of Provisional rule to ML model
    Predict if Provisional rule is most relevant rule
    if most relevant
      Add Provisional rule to recommended rule list of user rule
    Predict if Provisional rule is most irrelevant rule
    if most irrelevant
      Drop Provisional rule
}
```

The techniques described herein may be implemented in hardware, software, firmware, or any combination thereof. Various features of the different examples of systems 500, 600, 900 and 1200 may be combined in a single performance monitoring system. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
    collecting, by a performance monitoring system, telemetry data comprising metrics related to a network of computing devices, wherein, for each metric, metric values associated with a corresponding metric name of the metric are collected at each of a plurality of times according to a first collection sampling interval;
    evaluating, by the performance monitoring system, alert rules using the telemetry data, including evaluating a first alert rule of the alert rules by comparing metric values associated with a corresponding metric name of a first metric to a corresponding threshold value of the first alert rule at a plurality evaluation times;
    generating a metric attribute related to the alert rules based on a count related to the evaluating the first alert rule;
    determining, by the performance monitoring system, a predicted metric weight for the first metric based on the metric attribute; and
    determining, by the performance monitoring system, a second collection sampling interval for the first metric based on the predicted metric weight.

2. The method of claim 1, wherein the second collection sampling interval is different than the first collection sampling interval, the method further comprising subsequently collecting, by the performance monitoring system, corresponding metric values for the first metric using the second collection sampling interval.

3. The method of claim 1, further comprising determining, by the performance monitoring system, whether the first metric is a critical metric, and if the first metric is the critical metric, using a predetermined minimum sampling interval for the second collection sampling interval.

4. The method of claim 1, wherein collecting the telemetry data comprises performing a pull based collection process to collect the telemetry data.

5. The method of claim 1, wherein determining the predicted metric weight comprises performing a machine learning module to determine the predicted metric weight.

6. The method of claim 1, wherein determining the predicted metric weight comprises performing a regression analysis to determine the predicted metric weight.

7. The method of claim 1, further comprising updating a current collection sampling interval for the first metric on an on-going basis.

8. The method of claim 1, further comprising determining one or more related metrics that are related to the first metric, wherein the metric attribute includes a first metric access ratio and a group metrics access ratio for the one or more related metrics.

9. The method of claim 1, wherein the metric attribute is related to an access rate of a metric for the alert rules, and wherein the count is a count of times a metric is accessed in a fixed time duration.

10. The method of claim 1, wherein the metric attribute is a metric access ratio which is a ratio of access rate to a sample rate for the metric.

11. The method of claim 1, wherein the metric attribute is related to a hit rate of a metric for the alert rules, and wherein the count is a number of times the metric values associated with the corresponding metric name of the first metric is greater than the corresponding threshold value of the first alert rule.

12. The method of claim 1, further comprising instructing metric exporters in the network to provide the first metric according to the second collection sampling interval.

13. A performance monitoring system, comprising:
a memory; and
one or more processors in communication with the memory, the one or more processors configured to execute a collector and an alert rule evaluator service,
wherein the collector is configured to receive telemetry data via metric exporters, the telemetry data comprising metrics related to a network of computing devices, wherein, for each metric, metric values associated with a corresponding metric name are configured to be collected at each of a plurality of times based on a corresponding first predetermined collection sampling interval;
wherein the alert rule evaluator service is configured to evaluate alert rules using the telemetry data, wherein, to evaluate a first alert rule of the alert rules, the alert rule evaluator service compares metric values associated with a corresponding metric name of a first metric, compares a corresponding metric value to a corresponding threshold value of the first alert rule at each of a plurality of rule evaluation times, generates an alert if a comparison condition of the first alert rule is met, and stores the generated alerts in the memory,
wherein the collector is configured to: access the generated alerts in the memory to calculate a metric attribute of the first metric related to the alert rules based on a count related to the evaluating the first alert rule, determine a predicted metric weight using the metric attribute of the first metric, and determine a second collection sampling interval for the first metric based on the predicted metric weight.

14. The performance monitoring system of claim 13, wherein the collector is configured to subsequently collect metric values of the first metric using the second collection sampling interval.

15. The performance monitoring system of claim 13, wherein the collector is configured to determine whether the first metric is a critical metric, and if the first metric is the critical metric, a predetermined minimum sampling interval is used for the second collection sampling interval.

16. The performance monitoring system of claim 13, wherein the collector further comprises a machine learning module configured to determine the predicted metric weight.

17. The performance monitoring system of claim 13, wherein the collector is configured to perform a regression analysis to determine the predicted metric weight.

18. The performance monitoring system of claim 13, wherein the collector is configured to update a current collection sampling interval for the first metric on an on-going basis.

19. The performance monitoring system of claim 13, wherein the collector includes a critical metrics discovery service for determining one or more related metrics that are related to the first metric and wherein the metric attribute is a first metric access ratio and a group metrics access ratio for the one or more related metrics.

20. The performance monitoring system of claim 13, further comprising:
a metric time series database and a query history database, wherein the one or more processors are further configured to execute a metric querier in communication with the alert rule evaluator service and the metric time series database, the metric querier enabled to receive user queries regarding a metric and store user queries in the query history database, wherein the collector accesses the query history database to determine the predicted metric weight and the second collection sampling interval.

* * * * *